US008872693B1

(12) United States Patent
Malas et al.

(10) Patent No.: US 8,872,693 B1
(45) Date of Patent: Oct. 28, 2014

(54) RADAR SIGNATURE DATABASE VALIDATION FOR AUTOMATIC TARGET RECOGNITION

(71) Applicant: John A Malas, Kettering, OH (US)

(72) Inventors: John A Malas, Kettering, OH (US); Krishna Pasala, Centerville, OH (US)

(73) Assignee: The United States of America as respresented by the Secretary of the Air Force, Washington, DC (US)

( * ) Notice: Subject to any disclaimer, the term of this patent is extended or adjusted under 35 U.S.C. 154(b) by 198 days.

(21) Appl. No.: 13/693,079

(22) Filed: Dec. 4, 2012

Related U.S. Application Data

(63) Continuation-in-part of application No. 12/770,211, filed on Apr. 29, 2010, now Pat. No. 8,350,749.

(60) Provisional application No. 61/173,694, filed on Apr. 29, 2009.

(51) Int. Cl.
*G01S 7/41* (2006.01)
*G01S 13/90* (2006.01)

(52) U.S. Cl.
CPC .................................. *G01S 7/418* (2013.01)
USPC ........................... 342/90; 342/25 F; 342/195

(58) Field of Classification Search
CPC ... G01S 7/412; G01S 7/4052; G01S 13/9035; G01S 2007/4095; G01S 13/418; G09B 9/54
USPC ....... 342/25 R, 25 A, 25 F, 90, 165, 169–172, 342/195
See application file for complete search history.

(56) References Cited

U.S. PATENT DOCUMENTS

| 6,337,654 | B1 | 1/2002 | Richardson et al. |
| 7,002,509 | B2 | 2/2006 | Karlsson |
| 7,068,210 | B1 * | 6/2006 | Mitra et al. ...................... 342/63 |
| 7,545,307 | B2 * | 6/2009 | Shu .............................. 342/25 A |
| 7,602,332 | B1 * | 10/2009 | Lee et al. ....................... 342/169 |
| 7,692,573 | B1 | 4/2010 | Funk |
| 8,026,844 | B2 | 9/2011 | Fox et al. |
| 8,085,186 | B1 | 12/2011 | Malakian et al. |
| 8,242,952 | B1 | 8/2012 | Barr |
| 8,243,989 | B2 | 8/2012 | Vendrig |

(Continued)

OTHER PUBLICATIONS

Fuhrmann, Daniel R. and San Antonio, Geoffrey, "Transmit Beamforming for MIMO Radar Systems Using Partial Signal Correlation," Conference Record of the Thirty-Eighth Asilomar Conference on Signals, Systems and Computers, Nov. 10, 2004, Pacific Grove, CA, USA, vol. 1, pp. 295-299.
Malas, John A. and Pasala, Krishna M., "Information Theory Based Radar Signature Analysis," 2007 IEEE Aerospace Conference, Mar. 3-10, 2007, Big Sky, MT, USA, 13 pages.

(Continued)

*Primary Examiner* — John B Sotomayor
(74) *Attorney, Agent, or Firm* — AFMCLO/JAZ; Charles Figer, Jr.

(57) ABSTRACT

An information theoretic method for testing and/or validating the suitability of a multi-radar signature database to be used on radar systems having automatic target recognition. The database may include measured data and/or modeled synthetic data. The technique allows measured data to be compared to the synthetic data using modal mutual information. The present invention further includes an information theoretic method for real time calculation of automatic target recognition using modal mutual information calculation.

16 Claims, 12 Drawing Sheets

(56) References Cited

U.S. PATENT DOCUMENTS

| | | | |
|---|---|---|---|
| 8,244,469 | B2 | 8/2012 | Cheung et al. |
| 8,259,006 | B2 | 9/2012 | Culkin |
| 8,350,749 | B1 * | 1/2013 | Malas et al. ............... 342/90 |
| 2003/0164792 | A1 | 9/2003 | Jahangir et al. |
| 2006/0284761 | A1 | 12/2006 | Picard |
| 2007/0139251 | A1 | 6/2007 | Shu |
| 2007/0146195 | A1 | 6/2007 | Wallenberg et al. |
| 2008/0018525 | A1 * | 1/2008 | Svy et al. ............... 342/169 |
| 2009/0002224 | A1 | 1/2009 | Khatib et al. |
| 2010/0109938 | A1 | 5/2010 | Oswald et al. |
| 2011/0241928 | A1 | 10/2011 | Oswald et al. |
| 2011/0298650 | A1 * | 12/2011 | Yapa et al. ............... 342/118 |

OTHER PUBLICATIONS

Principe, J.C., et al., "Learning from Examples with Information Theoretic Criteria," Journal of VLSI Signal Processing 26, 61-77 (2000).

Bell, Mark Robert, Thesis, "Information Theory and Radar: Mutual Information and the Design and Analysis of Radar Waveforms and Systems," California Institute of Technology (1988).

Briles, Scott D., "Information-Theoretic Performance Bounding of Bayesian Identifiers," Proc. SPIE vol. 1960, Automatic Object Recognition III, 255 (Oct. 15, 1993).

Wyner, Aaron D., "The Common Information of Two Dependent Random Variables," IEEE Transactions on Information Theory, vol. IT-21 No. 2, pp. 163-179 (1975).

* cited by examiner

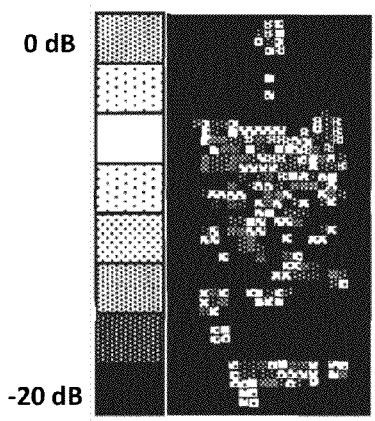
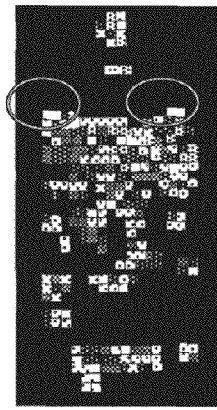
FIG. 12A  FIG. 12B
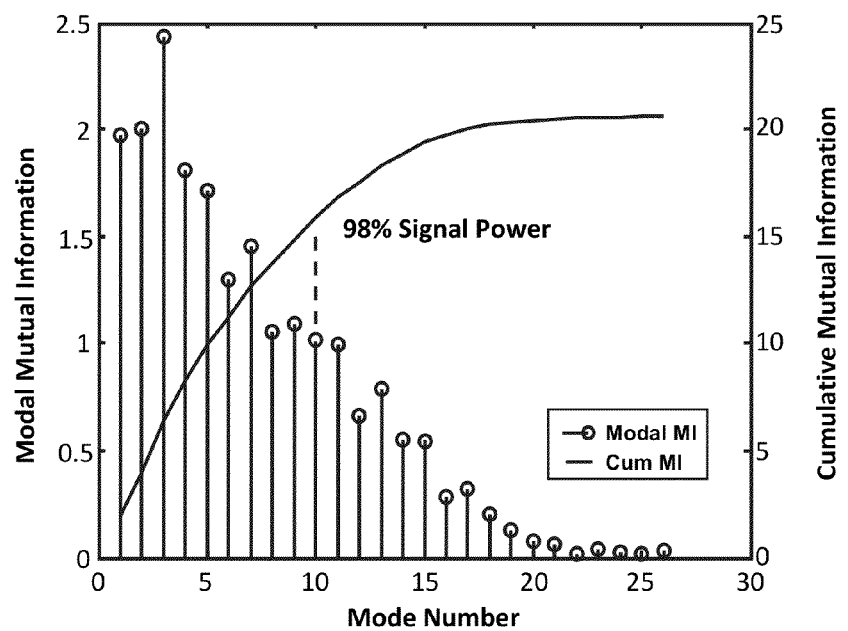
FIG 13

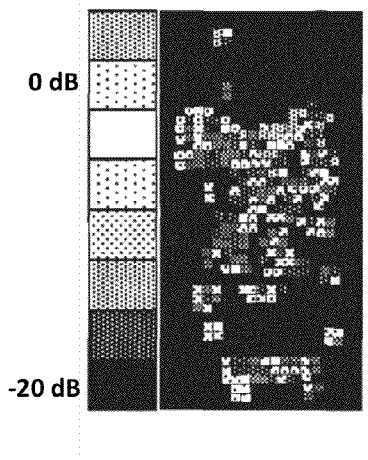
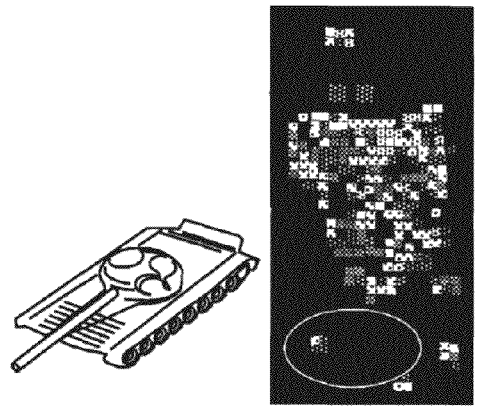
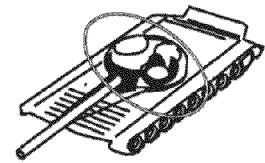
FIG. 14A
FIG. 14B
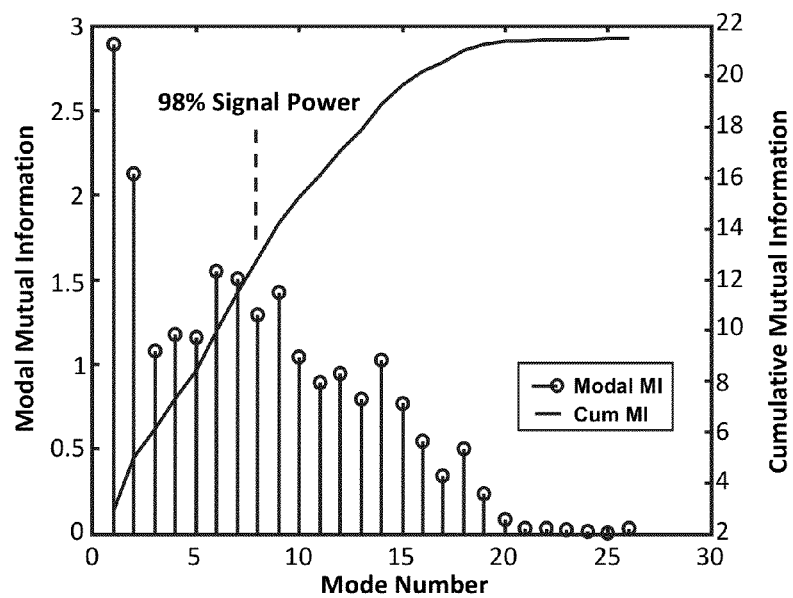
FIG. 15

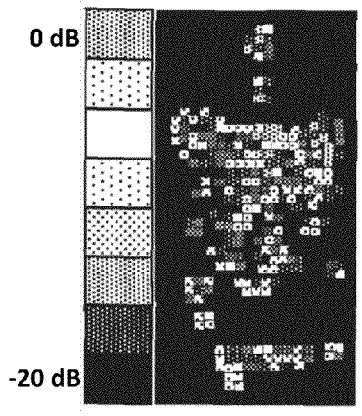 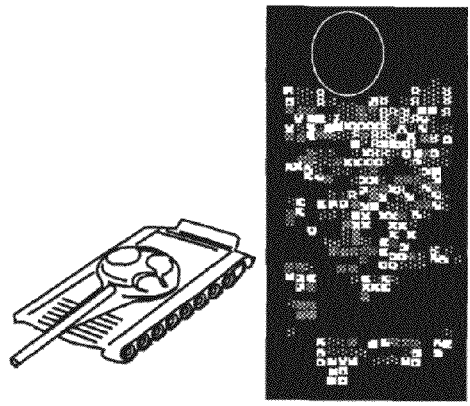
FIG. 16A　　　　　　　　　FIG. 16B
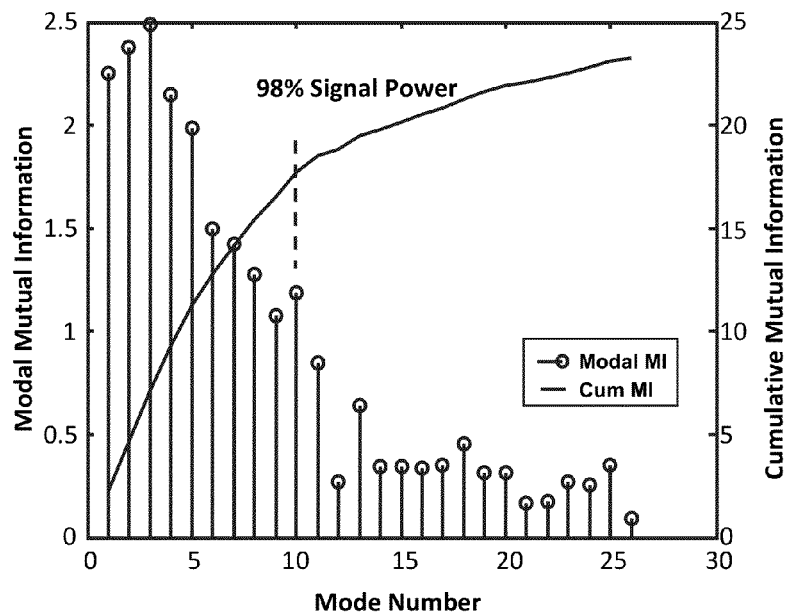
FIG. 17

RADAR SIGNATURE DATABASE VALIDATION FOR AUTOMATIC TARGET RECOGNITION

CROSS-REFERENCE TO RELATED APPLICATIONS

This application is a continuation-in-part of U.S. patent application Ser. No. 12/770,211 filed on Apr. 29, 2010, which further claims the benefit of U.S. Provisional Application Ser. No. 61/173,694 filed on Apr. 29, 2009, both of which are entitled "Radar Signature Database Validation for Automatic Target Recognition" and both of which are hereby incorporated herein by reference in their entirety.

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

This invention relates generally to the field of radar signature analysis. More particularly, it relates to information theoretic methods for assessing radar signature databases for use in training a radar target recognition decision algorithm and for identifying real-time target measurements using automatic target recognition.

2. Description of the Related Art

The ability to make radar signature databases portable for use within similar sensor systems may be critical to the affordability of future airborne signature exploitation systems. The capability to hybridize measured and synthetic signature database components may maximize the impact of the investment required to build complex radar signature databases. Radar target scattering mechanisms may be modeled and the signature signal model analyzed as a random process to enable portability and hybridization. Modal mutual information may be developed as a measure of similarity to compare measured signature data to modeled synthetic data. The inherent qualities of mutual information to be used in the context of the automatic target recognition problem may be demonstrated using synthetic signature sets comprised of both "similar targets" and "dissimilar targets."

Signature exploitation systems are of ever-increasing importance both in air-to-air and air-to-ground sensor systems. Successful implementation of these systems often requires a robust and integrated signature database for training exploitation algorithms. Signature training databases should represent the radar measured signature process across a wide range of target articulations and configurations, as well as under many operating conditions including clutter, obscuration, and other sources of RF interference. It is also useful to have signature databases that are portable for use in similar sensor applications. For example, it is desired that airborne radar systems associated with a type of aircraft be able to share a common radar signature database. Construction of a signature database based entirely on measurements is expensive and can be an impractical proposition. It is possible to construct a signature database using electromagnetic scattering codes.

However, given the complexity of typical targets including personnel carriers, tanks, aircraft, and missiles, etc., and the challenge of modeling a variety of electromagnetic scattering phenomena ranging from specular reflection to edge diffraction, smooth surface diffraction etc., computation of signatures with sufficient accuracy is a challenging task. Furthermore, it needs to be established that the computed signatures are consistent with measured signatures. The validation of the computed or surrogate sensor signature process with the measured signature process enables the expanded use of multi-source signature data for algorithm training within ongoing automatic target recognition (AIR) theory efforts, nearly all of which depend on a valid characterization of the signature scattering model for all targets of interest.

The use of high resolution radar measurements has been useful in the support of research and study of signature exploitation capability within airborne platforms. In view of the uncertainties in the aspect angle of the target, the high resolution signature may be considered to be a random vector. Given the changing geometry relative to the target within a typical radar measurement interval, the statistics associated with the high resolution random vector are often time varying. Therefore, the measured high resolution signature of the target at a given time "t" is a realization of a multidimensional random process (time varying random vector). If the target statistics are assumed to be stationary (constant with time), the sample signatures associated with this random vector correspond to a range of aspect angles in a small window about this reference.

The problem of validation is quite different from the design of target recognition algorithms. In the case of automatic target recognition algorithms, a signature measured under field conditions (which may be considered to be a sample realization of a random process) is compared to the signature random process corresponding to the different target classes of interest comprising a database. Unlike the automatic target recognition problem, the database similarity problem (validation) involves the comparison of two random signature processes.

SUMMARY OF THE INVENTION

The present invention compares two different high resolution signature databases within the context of validation similarity requirements for automatic target recognition systems. A radar database validation is disclosed that includes a first database associated with measured signature data and a second database associated with synthetic signature data. The second database is compared with the first database using modal mutual information calculations. The calculations of the modal mutual information for dissimilar targets are well separated from similar targets throughout the database, validating the synthetic database for automatic target recognition radar use.

The present invention includes a method for assessing radar signature databases for use in training a radar target recognition decision algorithm. In one embodiment, the method comprises the steps of: generating radar signature data from at least three targets using a first process and a second process, wherein the radar signature data includes at least one of measured radar data and synthetic radar data, and wherein the targets comprise at least two different target classes, at least two targets being in a same target class and at least one target being in a different target class; producing a first radar signature database using the first process and a second radar signature database using the second process; comparing the first radar signature database and the second radar signature database using an information theoretic method; computing an amount of cumulative mutual information between the first radar signature database and the second radar signature database for targets comprising the same target class and for targets comprising different target classes, wherein the cumulative mutual information comprises a sum of modal mutual information (MMI), derived from comparison of radar signature data from at least two targets, whereby numerical instabilities often incurred in computation of cumulative mutual information are eliminated through incremental computation of MMI; and based on the amount of cumulative mutual information between the first radar signature database and the second radar signature database, determining whether the first process and second process are suitable for use together to generate a hybrid radar signature database for training the radar target recognition decision algorithm.

In one embodiment of the method for assessing radar signature databases, the targets comprising the same target class include at least one target comprising at least one in-class structural variation of at least one dominant and isolated geometric mechanism that is conventionally critical to successful classification of targets to the same target class, wherein the in-class structural variation produces conventional signature features that are dissimilar to the radar signature data corresponding to the same target class. In one embodiment of the method where at least one target comprises at least one in-class structural variation, the amount of cumulative mutual information is ≥5 Nats, which is consistent with in-class declaration levels.

In another embodiment of the method for assessing radar signature databases, at least one of the targets comprising a different target class includes at least one target comprising at least one out-of-class structural variation of at least one dominant and isolated geometric mechanism that is conventionally critical to successful classification of targets to different target classes, wherein the out-of-class structural variation produces conventional signature features that are similar to the radar signature data corresponding to the different target class. In one embodiment of the method where at least one target comprises an out-of-class structural variation, the amount of cumulative mutual information is <5 Nats, which is consistent with out-of-class declaration levels. In another embodiment, the amount of cumulative mutual information is greater than zero and less than or equal to one.

In another embodiment, the method further comprises conducting offline improvements to at least one target class. In a further embodiment of the method for assessing radar signature databases, the first radar signature database consists of measured radar data and wherein the second radar signature database consists of synthetic radar data.

The present invention further includes a method of using cumulative modal mutual information to identify real-time target measurements using automatic target recognition. In one embodiment, the method comprises the steps of: generating within an onboard radar system a first radar signature process measurement derived from a real-time target measurement, wherein the first radar signature process measurement is generated through a mapping to a fixed measurement aspect angle to a field target and a range of frequency sub-bands centered at a center reference transmit frequency; producing a second radar signature process derived from a hybrid signature database, wherein the hybrid signature database comprises a combination of radar signature data derived from measured radar data and synthetic radar data; comparing the first radar signature process measurement and the second radar signature process using an information theoretic method; computing in real-time an amount of cumulative mutual information between the first radar signature process measurement and the second radar signature process, wherein the cumulative mutual information comprises a sum of modal mutual information (MMI) derived from comparison of the first radar signature process measurement and the second radar signature process, whereby numerical instabilities associated with computing cumulative mutual information are eliminated through incremental computation and combination of MMI; and based on the amount of cumulative mutual information between the first radar signature process measurement and the second radar signature process, determining an identity of the field target.

In one embodiment of the method of using cumulative modal mutual information to identify real-time target measurements, the target comprises at least one in-class structural variation of at least one dominant and isolated geometric mechanism that is conventionally critical to successful classification of the target, wherein the in-class structural variation produces conventional signature features that are dissimilar to the radar signature data corresponding to the same target class. In one embodiment of the method in which the target comprises at least one in-class structural variation, the amount of cumulative mutual information is ≥5 Nats, which is consistent with in-class declaration levels.

In another embodiment of the method of using cumulative modal mutual information to identify real-time target measurements, the target comprises at least one out-of-class structural variation of at least one dominant and isolated geometric mechanism that is conventionally critical to successful classification of the target, wherein the out-of-class structural variation produces conventional signature features that are similar to the radar signature data corresponding to the different target class. In one embodiment of the method in which the target comprises at least one out-of-class structural variation, the amount of cumulative mutual information is <5 Nats, which is consistent with out-of-class declaration levels. In another embodiment of the method, the amount of cumulative mutual information is greater than zero and less than or equal to one.

In a further embodiment of the method of using cumulative modal mutual information to identify real-time target measurements, the hybrid signature database is validated using a method for assessing radar signature databases for use in training a radar target recognition decision algorithm as presently disclosed. In another embodiment, the method further comprises conducting online improvements to a transmission waveform.

BRIEF DESCRIPTION OF THE DRAWINGS

FIG. 12A is a two dimensional image of T-72 tank, 0° Az/15° El target aspect angle with fender scattering.

FIG. 12B is a two dimensional image of T-72 tank, 0° Az/15° El target aspect angle without fender scattering.

FIG. 13 is a graphical illustration of MMI and cumulative MI for T-72 tank with fender scattering and T-72 without fender scattering, cumulative MI of 16 Nats.

FIG. 14A is a two dimensional image of T-72 tank, 0° Az/15° El aspect angle with fuel barrel scattering.

FIG. 14B is a two dimensional image of T-72 tank, 0° Az/15° El aspect angle without fuel barrel scattering.

FIG. 15 is a graphical illustration of MMI and cumulative MI for baseline T-72 scattering and baseline T-72 without fuel barrel scattering, cumulative MI of 14 Nats.

FIG. 16A is a two dimensional image of T-72 tank, 0° Az/15° El aspect angle with gun barrel scattering.

FIG. 16B is a two dimensional image of T-72 tank, 0° Az/15° El aspect angle without gun barrel scattering.

FIG. 17 is a graphical illustration of MMI and cumulative MI for baseline T-72 with gun barrel scattering and T-72 without gun barrel scattering, cumulative MI of 12 Nats.

DETAILED DESCRIPTION OF THE INVENTION

Figure 1:
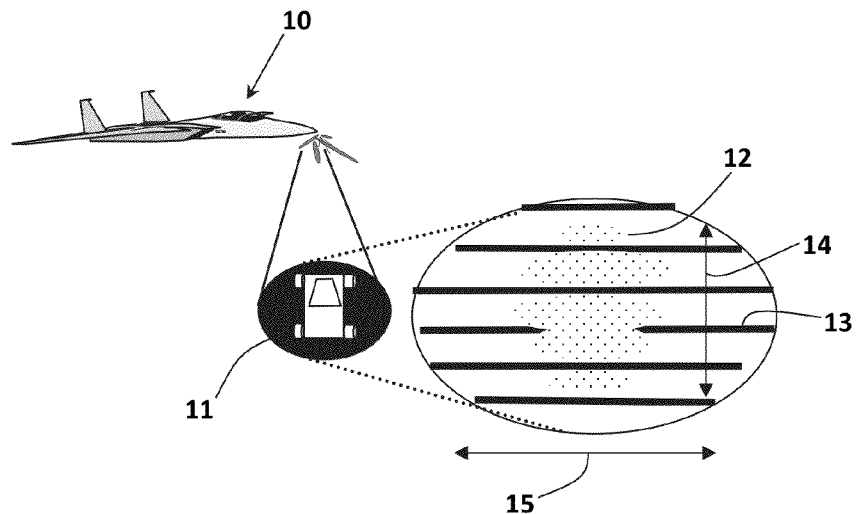
FIG. 1 is diagram of target scatterers extended in range and cross range.

Several existing published works are related (yet different) to the present invention. J. C. Principe, D. Xu, Q. Zhao, J. W. Fisher present a "learning theory" framework based on information theoretic criteria in "Learning from Examples with Information Theoretic Criteria," Journal of VLSI Signal Processing 26, 61-77, 2000. This and all other references are herein incorporated by reference. D. R. Fuhrmann and G. San Antonio, "Transmit Beamforming for MIMO Radar Systems Using Partial Signal Correlation Proceedings of the $38^{th}$ Asilomar Conference on Signals, Systems, & Computers, Vol. 1, 295-299, November 2004, describes radars with a new architecture referred to as the MIMO (Multiple Input Multiple Output) radar.

To a great extent the referenced work has either focused on improving sensor and waveform design for maximum target information measurement or has attempted to develop an information theoretic approach to performance prediction and decision rule design. Much of the above referenced work has focused on areas outside the validation and assessment of information associated with the random signature processes within the radar target training database.

The present invention provides a multi-source hybrid radar signature database for at least two radar signature processes for use in training automatic target recognition algorithms using the decision rule training by the hybrid signature set automatically compared with the field measured target signature to provide automatic target recognition based upon a calculation.

J. Malas, K. Pasala, "Information Theory Based Signature Analysis," Proceedings of 2007 IEEE Aerospace Conference, March 2007, introduced the use of mutual information as a similarity measure for use in radar signature database validation. One aspect of the present invention is the development and demonstration of modal mutual information (MMI) as a physics-based radar signature similarity measure compatible within the automatic target recognition problem context. Techniques are developed with the present invention to avoid numerical instability issues normally associated with the computation of mutual information. "Numerical issues" include the reduction of singularities and complications resulting from over represented (rank deficient) signature processes causing false positives, false negatives, and inconclusive results, one of more of which may be eliminated with the present invention.

The present invention provides a computationally stable method for analyzing and comparing two radar signature databases, one of which comprises synthetic radar signature data and one of which comprises radar signature data gathered by measurement under controlled conditions. Using MMI, the disclosed method calculates total mutual information between the two databases as a similarity measure for use in radar signature database validation.

The present invention further includes a method of using MMI as a classification method in an automatic target recognition (ATR) system. The radar signature of a target in the field is compared to a radar signature database, and using MMI, the target may be identified.

MMI is a modal decomposition of the mutual information. The choice of mutual information as a measure of signature database similarity is based on several unique characteristics of mutual information. Relative entropy is a measure of the distance between two distributions. The relative entropy $D(p\|q)$ is a measure of the inefficiency of assuming that a distribution is q when the true distribution is p.

MMI provides a mathematical computational approach that avoids or surmounts the computational barriers of other methods. Such barriers may include infinity failures or calculations that may result in more false positives, false negatives, or indecisive results than obtainable with the present invention.

Mutual information is the relative entropy between the joint distribution f(p,q) and the product of the respective marginal distributions f(p)·f(q). The mutual information between p and q will be zero if, and, in one embodiment, only if, $p \perp q$ (p is statistically independent of q) and represents the reduction in uncertainty in one random variable given the knowledge of another. Mutual information is a measure of the dependence between random variables and is a more general (contains all the statistics) measure of similarity.

In contrast, a simple cross correlation involves only the second order statistics of the variables under test. Mutual information (via statistical dependence) can be used to determine the degree of common "information" within the physical scattering that is present in both of the random signature processes.

While techniques including maximum likelihood tests operate within the full dimensionality of the data, mutual information operates within the "typical set" of the signature subspace that is related the entropy of the signature processes. Attributes of entropy-based methods and mutual information offer the potential to measure similarity within this lower dimensional space. The ability to relate one embodiment of this generalized mutual information similarity measure directly to Bayes error through an information theoretic systems theory is a significant strength of this approach.

In one embodiment of the present invention, MMI is used to compare two high range resolution signature random processes $\vec{X}$ and $\vec{Y}$. High range resolution signatures of complex extended targets may be associated with complex random processes that are circular Gaussian. Numerical computation of mutual information with methods described in the prior art can be unstable due to the singularities that exist when the individual or joint correlation matrices of $\vec{X}$ and/or $\vec{Y}$ are rank deficient or ill conditioned. The concept of MMI is introduced to overcome these numerical problems and obtain a stable computed value of mutual information between $\vec{X}$ and $\vec{Y}$. Using electromagnetic prediction codes, high range resolution signature processes $\vec{X}$ and $\vec{Y}$ are computed for a number of different target classes at a sampled range of aspect angles.

These experimental examples are designed to demonstrate the implementation of MMI and more importantly, to demonstrate that the strength of mutual information may be used successfully to provide a multi-source signature database taken from at least two different processes each comprising either a measurement radar process or computed modeling process. The database includes measured radar data and modeled synthetic radar data, which are compared using the modal mutual information method disclosed herein. The measured data is mathematically compared to the synthetic modeled data and combined to create a hybrid signature set using MMI. The hybrid signature set in one embodiment is high resolution data and/or a combination of two high range resolution signature processes. The hybrid signature set in another embodiment includes both variants of similar targets and dissimilar targets. A hybrid signature database may include surrogate measured data (data generated from a radar measurement device other than that being used to conduct the automatic target recognition), measured data generated from the radar measurement device being used to conduct the automatic target recognition, modeled synthetic data, or any combination thereof. The hybrid signature set is used to train (or design) classification decision rules to automatically evaluate the target signature formed from real time field measurements to provide automatic target recognition based upon a target classification calculation.

An automatic target recognition radar database validation may include a first database associated with measured radar data and a second database associated with synthetic data. The second database may be compared with the first database using modal mutual information calculations. The calculations of the cumulative mutual information for dissimilar targets are well separated from a similar target throughout the database, validating the synthetic database for automatic target recognition radar use. There are other uses for the particular application of modal mutual information calculations where overcoming the mathematical barriers are needed to reach reliable solutions.

The comparison signature process is preferably based on the underlying common physical scattering information. Modeled variants of the actual target physical scattering are preferably used to form the cases for demonstrating mutual information as a method for database validation in automatic target recognition.

A random signature process may be formed through a mapping of high range resolution signature to target azimuth/elevation aspect angle locations distributed within a local window about a center reference aspect angle to the target. While not guaranteed one-to-one, the mapping to aspect angle is sufficient to represent the support of the function.

A random signature process may also be formed through a mapping to a fixed aspect angle and a range of frequency sub-bands centered at a reference frequency. Unless otherwise noted, the mapping used shall be to aspect angle.

Conventional classification methods for distinguishing between two dissimilar targets rely on dominant and isolated geometric mechanisms that produce highly dissimilar signature features. Conventional classification methods are vulnerable to false declarations of dissimilar targets based on the limitations of this method. False declarations of dissimilar targets can occur when isolated geometric features are not observable by radar measurement systems. It is desired to use a similarity method for database validation that overcomes this limitation. MMI is used a similarity measure because it operates on the complete underlying common physical scattering information and not on isolated geometric physical mechanisms.

When the two signature processes $\vec{X}$ and $\vec{Y}$ correspond to two different target classes, the cumulative mutual information is near zero, even when the targets appear to be a "close" match and could be considered a "confuser" based on conventional geometric or feature-based measures. A confuser may include a false positive, a false negative, or an inconclusive determination. The confusion may be in part because the high range resolution signature processes of two different target classes are independent, and the cumulative mutual information between independent processes is zero, even when they appear "close" by conventional measures.

When the signature processes correspond to the same target class, but with variations, the cumulative mutual information remains high. This correlation is demonstrated by determining the MMI between the signature processes of a target and its variants. The variants are obtained, for example, by removing certain physical features from the original target. A number of such variants are created. Cumulative mutual information is consistently high between signatures corresponding to targets with in-class variations. Cumulative mutual information is consistently low between signatures corresponding to targets with out-of-class variations. Thus, the modal mutual information calculations developed herein may be used to determine if two signature processes, obtained by two different methods (measured and synthetic, for example) correspond to in-class or out-of-class targets.

The electromagnetic phenomenology of the signature process together with the characteristics of the sensor may be used to create a signal model for the high range resolution signature. In the high frequency regime, the high range resolution target signature may be approximated as a collection of scattering centers valid over a limited aspect window and frequency band.

These scattering centers may be considered to be localized to a point and may represent a variety of scattering phenomena ranging from specular reflection to diffraction phenomena, including edge and tip diffraction. The fields radiated by these point scatterers depend upon both temporal and spatial frequencies (angular dependence). Because the radar illuminating the target has finite bandwidth and is a one dimensional imaging system, the target is seen as a collection of contiguous swaths of range, with each range swath corresponding to a particular range. The extent of each range swath, range resolution, depends upon the signal bandwidth. For a typical extended target of interest, each range swath contains a number of scattering centers that can be widely spaced in cross-range as shown in FIG. 1.

Referring now to the drawings, like reference numerals may designate like or corresponding parts throughout the several views. FIG. 1 shows an aircraft 10, detecting a tank 11 to produce tank scattering 12 with range bins 13, a down-range dimension 14, and a cross-range dimension 15.

The electromagnetic field obtained as a result of the interference of the scattered fields from the scattering centers appears as the signal corresponding to the range bin 13 of the high range resolution signature.

Figure 2:
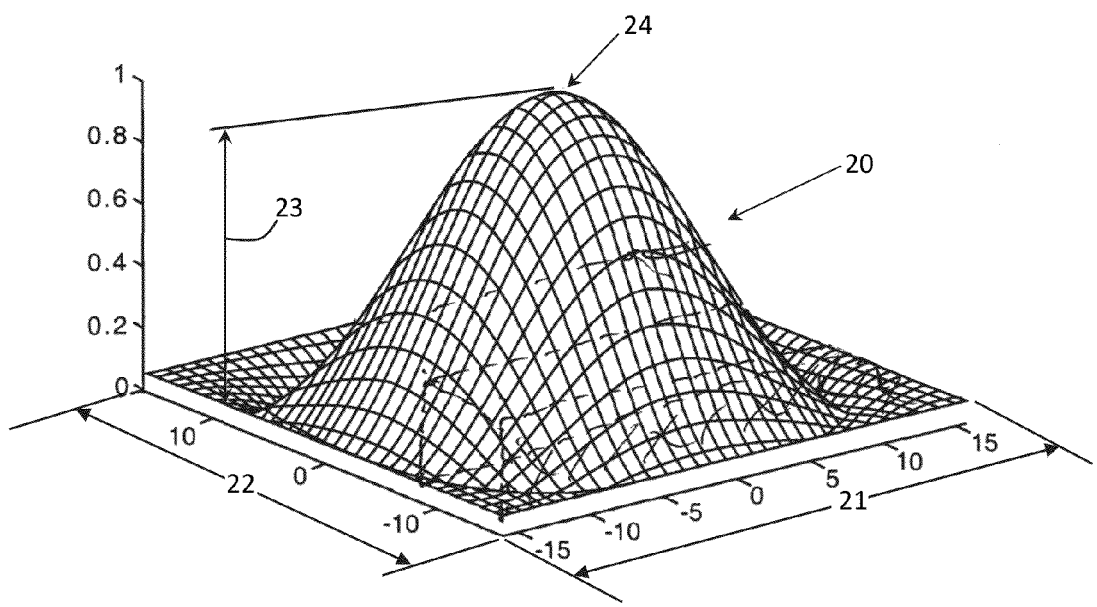
FIG. 2 is a theoretical point spread function example for the band limited response.

The high range resolution signature may be considered a one dimensional image of the reflectivity (or scattering) profile of the target for a given look angle and bandwidth. Due to finite bandwidth of a practical radar system, the point spread function is not an impulse function. As shown in FIG. 2, a mainlobe 20 of finite width 21, length 22, and height 23 sets a limit on the range resolution achievable, and sidelobes (not shown). The mainlobe 20 and sidelobes have decreasing amplitude in all directions from a peak 24.

Even when the scattering phenomenon is localized to a specific range bin, this phenomenon will manifest as reflectivity that is present in other range bins as well. Therefore every point target at any specific range location will present itself as collateral scattering phenomenon at other ranges. The value of the reflectivity at the actual location is defined as a "signal" and at all other locations as "noise."

On an actual or non-scattering center approximated target, this "noise" would comprise the effects of non-localized scattering at any given time delay, as well as the windowed side-lobe response of localized scattering.

Hence, at any given range location, the observed data is comprised of a component due to the coherent interference of all the mainlobe point-like target phenomenon present at that location (the signal component) and a component that is the sum total of the collateral contributions (side lobes) that occur in range bins other than the range bin of interest. This latter component may be referred to as noise and the observed data in the $i^{th}$ range bin may be modeled as in Equation (Eq.) (1).

$$X_i = S_i + N_i \quad (1)$$

The signal component at any range bin is due in part to the interference of the scattered fields from all the scattering centers distributed in cross range over several wavelengths and may be expressed as in Eq. (2).

$$V_i = \sum_{n=1}^{N} A_n e^{j\phi_n} \quad (2)$$

Here $A_n$ and $\phi_n$ are the amplitude and modulo $2\pi$ phase of the $n^{th}$ scatter in the $i^{th}$ range bin respectively. $\phi_n$ is a function of the look angle and frequency and may be modeled as a random variable uniformly distributed between $[0, 2\pi]$. Given that $\sigma_{A_i}^2$ and $\mu_{A_i}$ are the variance and the mean of the amplitudes, it can be readily shown that as $N \to \infty$ both real and imaginary parts of $V_i$ are zero mean Gaussian random variables with a variance given in Eq. (3).

$$\sigma_i^2 = \frac{N \cdot (\sigma_{A_i}^2 + \mu_{A_i}^2)}{2} \quad (3)$$

Figures 3A, 3B:
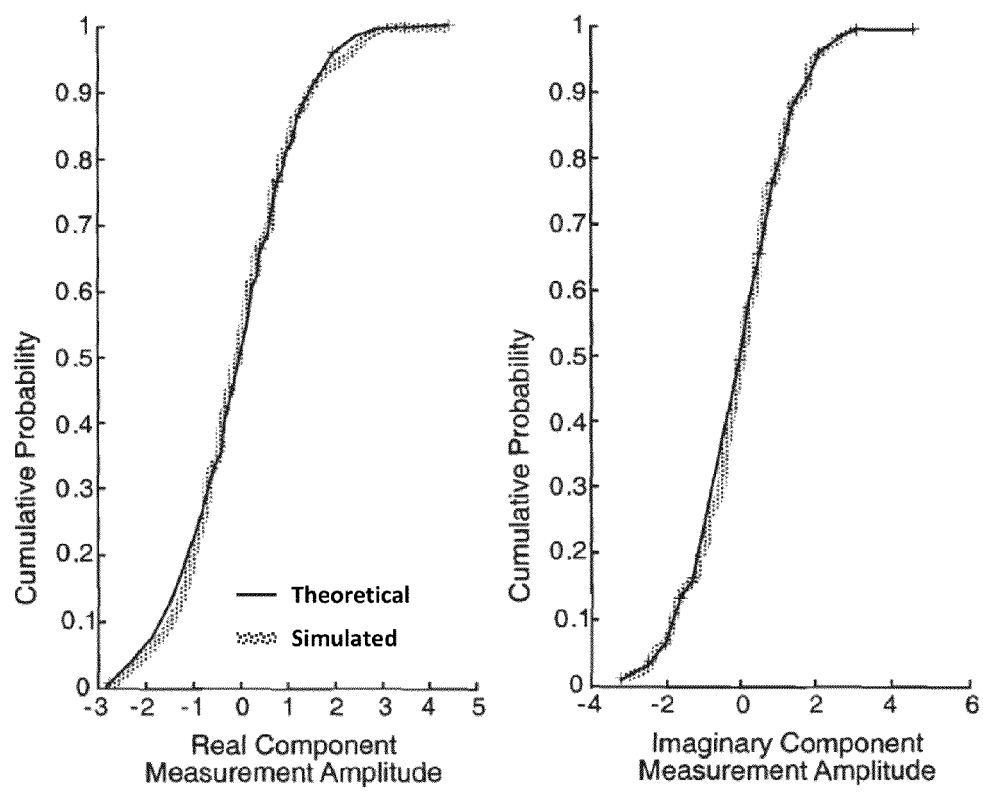
FIGS. 3A and 3B are comparisons of Kolmogorov-Smirnov test results and illustrate the agreement between the theoretical and simulated Gaussian cumulative probability distributions.

The theoretical Gaussian shape of the real and imaginary components of the signature (afforded by the central limit theorem) meets the criteria for parametric estimation and as such, the Kolmogorov-Smirnov test (K-S test) is employed to verify the Gaussian shape assumption. The K-S statistic indicates the level of agreement between two continuous distributions that are fully specified (location, scale and shape). At one foot resolution, these test results indicate that there are sufficient numbers of scatterers contributing within each range bin to validate the assumption that for electrically large targets with many scattering sources extended in cross range, the probability density functions (pdfs) associated with the real and imaginary signature data are in fact Gaussian and zero mean. An example of the real and imaginary components of the signal within a high range resolution range bin conforming to the Gaussian distribution is provided in FIGS. 3A and 3B, which show the K-S test results of high range resolution. The signature range bin illustrates the agreement between the theoretical and simulated Gaussian cumulative probability distributions.

Hence, given the appropriate bandwidth and target characteristics outlined above, both the signal and noise components of the signal in any range bin are assumed to be complex Gaussian distributed random variables. The signal component is obtained from the interference of the mainlobes of the point spread functions and the noise components are obtained from the sidelobes of the point spread functions. The high range resolution signature vector may be modeled in the vector version of Eq. (3) as shown in Eq. (4).

$$\vec{X} = \vec{S} + \vec{N} \quad (4)$$

While the ease of analysis afforded by the Gaussian distribution is helpful in developing concepts pictured below, all results produced using continuous vector random variables can be reproduced using discrete random variables.

The variation in signature phenomenology due to the uncertainties in the aspect angle are captured in the signal model illustrating that the high range resolution signature may be viewed as a random process. All random processes under analysis herein are assumed to be stationary. The covariance matrix of the random process and its representation in terms of eigenmodes are used in the following experimental examples.

A small window of aspect angles, typically less than 5°×5° in azimuth and elevation around a specified aspect, is experimentally chosen for targets of interest at X-band frequencies (8-12 GHz) in the following example. The targets are electrically large with dimensions in range and cross-range of many wavelengths. An ensemble of complex high range resolution signatures, $[\vec{X}_I]_{I=1}^{L}$, corresponding to a number of aspect angles distributed in this window are used to estimate (unbiased) the covariance matrix, $$\hat{C} = \frac{1}{(L-1)} \sum_{l=1}^{L} \vec{x}_l \cdot \vec{x}_l^H.$$

The factor (L−1) can be changed to L for the maximum Likelihood estimator of the Gaussian case. A spectral decomposition of this covariance matrix may be expressed as given in Eq. (5).

$$\hat{C} = \sum_{k=1}^{M} \lambda_k \cdot \hat{q}_k \cdot \hat{q}_k^H \quad (5)$$

Figure 4:
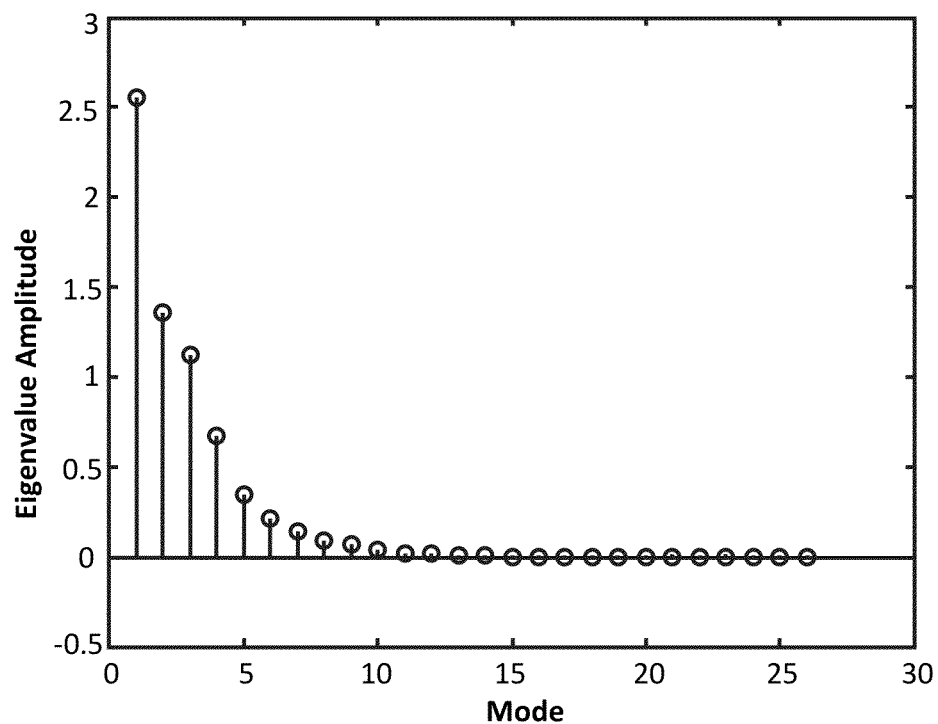
FIG. 4 is an eigenspectrum illustration for BTR-70 ground target in 2.5 Az×2.5 El degree spatial sampling window; 100 signatures uniformly distributed in Az/El, 1 ft. resolution.
Figure 5:
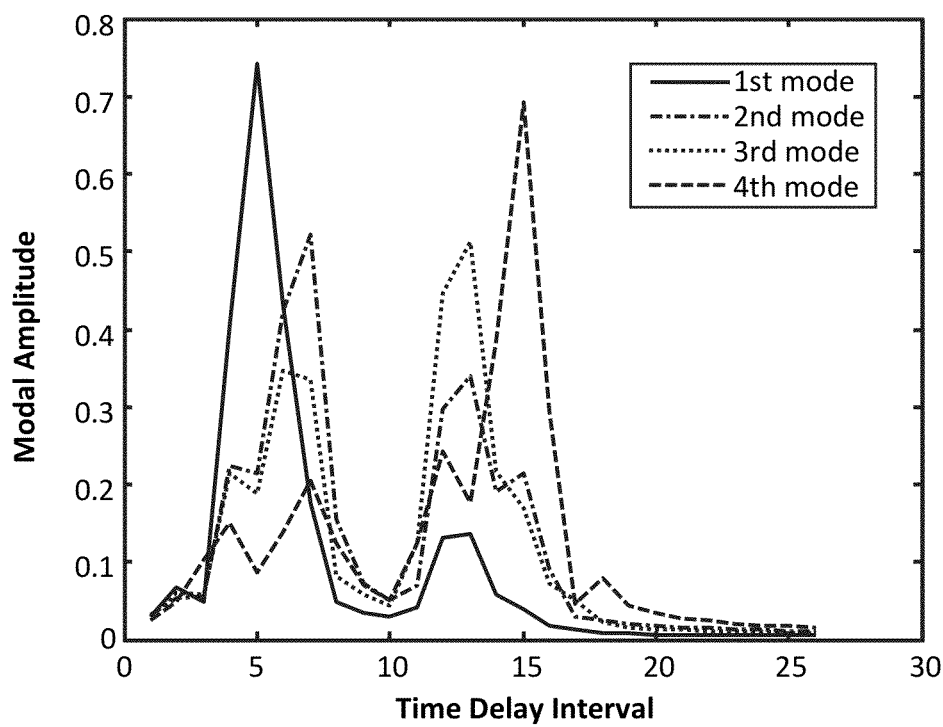
FIG. 5 is an eigenmodes illustration for BTR-70 ground target in 2.5 Az×2.5 El degree spatial.

Here $\lambda_k$ and $\hat{q}_k$ represent the eigenvalues and the corresponding eigenvectors. M is the size of the correlation matrix and equals the number of range bins. FIG. 4 shows the eigenspectrum for such a window for the BTR-70 target (armored personnel carrier) in 2.5 Az×2.5 El degree spatial sampling window; 100 signatures uniformly distributed in Az/El, 1 foot. resolution. FIG. 4 suggests the possibility of a decomposition of the signature space into signal and noise subspaces consistent with the signal model defined by Eq. (4). The eigenspectrum for the BTR-70 ground target in FIG. 5 shows some of the eigenmodes associated with this decomposition for the target in 2.5 Az×2.5 El degree spatial sampling window. It may be noted that these eigenmodes form a complete basis set for database validation.

Let $\vec{X}$ represent a signature vector random process corresponding to a specified target in a 2.5°×2.5° aspect angle window. Therefore, $$\vec{X} = [X_1, X_2, \ldots X_M]^T \quad (6)$$

In Eq. (6), $X_i$, i=1, 2 . . . M are the random variables representing the signals in the M range bins. Let $\vec{X}$ be obtained using a computational process. Let $\vec{Y} = [Y_1, Y_2, \ldots Y_M]^T$ be the signature random process corresponding to the same target and aspect angle, but obtained by a different method, for instance by a controlled measurement process. Validation of the database requires a comparison of the random processes $\vec{X}$ and $\vec{Y}$ to determine how "close" or "different" they are. Toward this end, the mutual information between $\vec{X}$ and $\vec{Y}$ may be used as a measure of similarity between them or lack thereof. The mutual information is defined as given below in Eq. (7).

$$I(\vec{X}; \vec{Y}) = h(\vec{X}) - h(\vec{X}/\vec{Y}) \quad (7)$$
$$= h(\vec{X}) + h(\vec{Y}) - h(\vec{X}, \vec{Y})$$

In Eq. (7), $h(\vec{X})$ and $h(\vec{Y})$ represent the differential entropies of $\vec{X}$ and $\vec{Y}$; $h(\vec{X}/\vec{Y})$ is the conditional entropy and also is referred to as the equivocation of $\vec{X}$ given $\vec{Y}$; and $h(\vec{X}, \vec{Y})$ is the joint differential entropy of $\vec{X}$ and $\vec{Y}$. The differential entropy $h(\vec{X})$ is defined in Eq. (8).

$$h(\vec{X}) = E[-\ln f(\vec{x})] = -\int f(\vec{x}) \ln(f(\vec{x})) d\vec{x} \quad (8)$$

In Eq. (8), $f(\vec{x})$ is the probability density function of $\vec{X}$. $h(\vec{X})$ is expressed in units of Nats, which is a logarithmic unit of information or entropy based on natural logarithms and powers of e rather than the powers of 2 associated with base 2 logarithms which define the bit.

The high range resolution signature is a complex, vector, zero-mean Gaussian process whose probability density function is given by Eqs. (9) and (10).

$$f_{\vec{x}}(\vec{x}) = \frac{1}{\pi^M |\det C_{\vec{x}}|} e^{-Q(\vec{x})} \quad (9)$$

and (10)

$$Q(\vec{X}) = \vec{X}^H C_{\vec{x}}^{-1} \vec{X}$$

$C_{\vec{x}} = E[(\vec{X} - \mu_{\vec{x}})(\vec{X} - \mu_{\vec{x}})^H]$ is the covariance matrix of $\vec{X}$. For this case, a closed form expression for the differential entropy is easily obtained and is given by Eq. (11).

$$h(\vec{X}) = M \ln(e\pi) + \ln|\det C_{\vec{x}}| \quad (11)$$

Expressing the determinant of $C_{\vec{x}}$ as $$\det(C_{\vec{x}}) = \prod_{k=1}^{M} \lambda_k^x,$$

where $\lambda_k^x$ are the eigenvalues of the covariance matrix $C_{\vec{x}}$, $h(\vec{X})$ may be expressed as $$h(\vec{X}) = \sum_{k=1}^{M} \ln(\pi e \lambda_k^x). \quad (12)$$

Similarly, $h(\vec{Y})$ may be expressed as $$h(\vec{Y}) = \sum_{k=1}^{M} \ln(\pi e \lambda_k^y) \quad (13)$$

In Eq. (13), $\lambda_k^y$, k=1, 2 . . . M are the eigenvalues of the $C_{\vec{y}}$. Note that these expressions are for the complex signature processes of $\vec{X}$ and $\vec{Y}$. The joint entropy $h(\vec{X}, \vec{Y})$ may also be obtained by defining the vector $\vec{U} = [\vec{X}; \vec{Y}]$ and defining Eq. (14), the covariance matrix $C_{\vec{U}}$:

$$C_{\vec{U}} = \begin{bmatrix} C_{\vec{x}} & C_{\vec{xy}} \\ C_{\vec{xy}}^H & C_{\vec{y}} \end{bmatrix} \quad (14)$$

In Eq. (14), $C_{\vec{xy}}$ is the cross-covariance between $\vec{X}$ and $\vec{Y}$. Then $h(\vec{X}, \vec{Y})$ can be written as is shown in Eq. (15):

$$h(\vec{X}, \vec{Y}) = h(\vec{U}) = \sum_{k=1}^{2M} \ln(\pi e \lambda_k^U) \quad (15)$$

In Eq. (15), $\lambda_k^U$, k=1, 2 . . . , 2M are the eigenvalues of $C_{\vec{U}}$. The expression for the mutual information is given by Eq. (16):

$$I(\vec{X}, \vec{Y}) = \ln\left[\frac{\left(\prod_{k=1}^{M} \lambda_k^x\right)\left(\prod_{k=1}^{M} \lambda_k^y\right)}{\left(\prod_{k=1}^{2M} \lambda_k^U\right)}\right] \quad (16)$$

Eq. (18) for mutual information requires the computation of the eigenvalues of $C_{\vec{x}}$, $C_{\vec{y}}$, and $C_{\vec{U}}$. However, when $C_{\vec{x}}$ and $C_{\vec{y}}$ are rank deficient, there are numerical issues that should be dealt with carefully. It can be shown that for any null eigenvalues of $C_{\vec{x}}$ and $C_{\vec{y}}$, there are always corresponding null eigenvalues of $C_{\vec{U}}$, resulting in the cancellation of singularities. Numerically, however, the eigenvalues are never exactly zero, leading to the subtraction of two large numbers. Such a procedure is not recommended. The following process computes mutual information in a way that avoids any numerical difficulties and, in addition, provides significant insight into comparing two signature processes as herein claimed.

Let the two random processes $\vec{X}$ and $\vec{Y}$ be expressed in terms of their components along a basis set of orthonormal vectors. It is convenient to choose the eigenvectors of $C_{\vec{x}}$ or $C_{\vec{y}}$ as the basis. The choice of eigenvectors from $C_{\vec{x}}$ or $C_{\vec{y}}$ is a valid one when each covariance matrix is highly diagonalized and the eigenvalue sensitivity is low. This is articulated in detail and the Gershgorin circle theorem. Another possible choice is the basis set of vectors that simultaneously diagonalize both $C_{\vec{x}}$ and $C_{\vec{y}}$. Here, the eigenvectors of $C_{\vec{x}}$, denoted by $\hat{q}_k$, k=1, 2 . . . M, are chosen. In this case, the spectral decomposition of $C_{\vec{x}}$ is expressed in Eq. (17):

$$C_{\vec{x}} = \sum_{k=1}^{M} \lambda_k \hat{q}_k \hat{q}_k^H \quad (17)$$

In Eq. (17), $\lambda_k$, k=1, 2 . . . M are the eigenvalues. The eigenvectors of $C_{\vec{x}}$ are a complete orthonormal set of basis vectors. Thus, $\vec{X}$ and $\vec{Y}$ may be expressed in equation (18) as Eq. (18):

$$\vec{X} = \sum_{k=1}^{M} \vec{S}_{xk} = \sum_{k=1}^{M} A_{xk} \hat{q}_k, \text{ and } A_{xk} = \hat{q}_k^H \vec{X} \quad (18)$$

$$\vec{Y} = \sum_{k=1}^{M} \vec{S}_{yk} = \sum_{k=1}^{M} A_{yk} \hat{q}_k, \text{ and } A_{yk} = \hat{q}_k^H \vec{Y}.$$

The random processes $A_{xk}$ and $A_{yk}$ are zero-mean Gaussian random processes and that in Eq. (19):

$$E(|A_{xk}|^2) = \sigma_{xk}^2 = \lambda_k^x \quad (19)$$

And in Eq. (20):

$$E(|A_{yk}|^2) = \sigma_{yk}^2 = \upsilon_k^y \quad (20)$$

While $\lambda_k^x$ are the eigenvalues of $C_{\vec{x}}$, $\upsilon_k^y$ are not the eigenvalues of $C_{\vec{y}}$. This is a result of adopting the eigenmodes of $C_{\vec{x}}$ as the basis. The random vectors $\vec{S}_{xk}$ and $\vec{S}_{yk}$ are referred to as the $k^{th}$ modes of $\vec{X}$ and $\vec{Y}$.

The mutual information of a sum of statistically independent processes is equal to the sum of the mutual information of the corresponding processes. Thus, only the mutual information of $\vec{S}_{xk}$ and $\vec{S}_{yk}$ need be considered, as given by Eq. (21):

$$I(\vec{S}_{xk}; \vec{S}_{yk}) = h(\vec{S}_{xk}) + h(\vec{S}_{yk}) - h(\vec{S}_{xk}, \vec{S}_{yk}) \quad (21)$$

$$= h(\vec{S}_{xk}) + h(\vec{S}_{yk}) - h(\vec{S}_{xyk})$$

where $\vec{S}_{xyk} = [\vec{S}_{xk}; \vec{S}_{yk}]$

The covariance matrices for $\vec{S}_{xk}$ and $\vec{S}_{yk}$ are of the order M and are given by Eq. (22) and (23):

$$C_{\vec{x}_k} = E[\vec{S}_{xk} \vec{S}_{xk}^H] = E(|A_{xk}|^2) \hat{q}_k \hat{q}_k^H = \lambda_k^x \hat{q}_k \hat{q}_k^H \quad (22)$$

$$C_{\vec{y}_k} = E[\vec{S}_{yk} \vec{S}_{yk}^H] = E(|A_{yk}|^2) \hat{q}_k \hat{q}_k^H = \upsilon_k^y \hat{q}_k \hat{q}_k^H \quad (23)$$

Clearly both $C_{\vec{x}_k}$ and $C_{\vec{y}_k}$ are rank one matrices with only one non-zero eigenvalue and (M−1) zero eigenvalues. The entropies $h(\vec{S}_{xk})$ and $h(\vec{S}_{yk})$ are given by:

$h(\vec{S}_{xk}) = \ln(\pi e \lambda_k^x) + (M-1)$ singularities (corresponding to the null eigenvalues of $C_{\vec{x}_k}$)

and $h(\vec{S}_{yk}) = \ln(\pi e \upsilon_k^y) + (M-1)$ singularities (corresponding to the null eigenvalues of $C_{\vec{y}_k}$).

Presently, it will be shown that $h(\vec{S}_{xyk})$ has 2(M−1) singularities corresponding to the 2(M−1) null eigenvalues of $C_{\vec{x}\vec{y}_k}$.

The vector $\vec{S}_{xyk}$ may conveniently be expressed as is given in Eq. (24):

$$\vec{S}_{xyk} = \begin{bmatrix} \vec{S}_{xk} \\ \vec{S}_{yk} \end{bmatrix} = \begin{bmatrix} A_{xk} \hat{q}_k \\ A_{yk} \hat{q}_k \end{bmatrix} = \vec{A}_{xyk} \otimes \hat{q}_k \quad (24)$$

In Eq. (24), $\vec{A}_{xyk} = [A_{xk}, A_{yk}]^T$, and $\otimes$ indicates the Kronecker product. Then the covariance matrix $C_{\vec{x}\vec{y}_k}$ is given in Eq. (25) as:

$$C_{\vec{x}\vec{y}_k} = E[\vec{S}_{xyk} (\vec{S})_{xyk}^H] \quad (25)$$

$$= E[(\vec{A}_{xyk} \otimes \vec{q}_k)(\vec{A}_{xyk}^H \otimes \vec{q}_k^H)]$$

$$= E[(\vec{A}_{yxk} \vec{A}_{xyk}^H) \otimes (\hat{q}_k \hat{q}_k^H)]$$

$$= E[\vec{A}_{xyk} \vec{A}_{xyk}^H] \otimes \hat{q}_k \hat{q}_k^H$$

$$= C_{\vec{A}} \otimes \hat{q}_k \hat{q}_k^H,$$

In Eq. (25), $C_{\vec{A}} = E[\vec{A}_{xyk} \vec{A}_{xyk}^H]$ is a 2×2 matrix. The eigenvalues and eigenvectors of $C_{\vec{x}\vec{y}_k}$ may be obtained using mathematical methods known in the art.

Since $C_{\vec{x}\vec{y}_k} = C_{\vec{A}}(x)\hat{q}_k\hat{q}_k^H$, where $C_{\vec{A}}$ is a 2×2 matrix and $\hat{q}_k\hat{q}_k^H$ is an M×M matrix, there are 2M eigenvalues and corresponding eigenvectors given by $$\alpha_{ij} = \check{\lambda}_i \xi_j, i=1,2 \text{ and } j=1,2\ldots M \quad (5)$$

and $$\hat{\chi}_{ij} = \hat{\theta}_i(x) \hat{\omega}_j, i=1,2 \text{ and } j=1,2\ldots M, \quad (10)$$

$\check{\lambda}_i$ and $\hat{\theta}_i$, i=1,2 are the two eigenvalues and eigenvectors of $C_{\vec{A}}$ and $\xi_i$ and $\hat{\omega}_i$, i=1, 2, ... M are the M eigenvalues and eigenvectors of $\hat{q}_k\hat{q}_k^H$ respectively. However, noting that $\hat{q}_k\hat{q}_k^H$ is a rank one matrix, there is only one non-zero eigenvalue, $\xi_1=1$ and (M−1) zero eigenvalues. Thus, $C_{\vec{x}\vec{y}_k}$ has two non-zero eigenvalues $\check{\lambda}_1$ and $\check{\lambda}_2$, the two eigenvalues of $C_{\vec{A}}$, and 2(M−1) null eigenvalues.

The differential entropy $h(\vec{S}_{xk}, \vec{S}_{yk})$ may now be written as:

$$h(\vec{S}_{xk}, \vec{S}_{yk}) = \ln(\pi e \check{\lambda}_1) + \ln(\pi e \check{\lambda}_2) + 2(M-1) \text{ singularities.}$$

It may be noted that the logarithmic singularities are due to the null eigenvalues. The mutual information $I(\vec{S}_{xk}; \vec{S}_{yk})$ may now be written as:

$$I(\vec{S}_{xk}; \vec{S}_{yk}) = \ln(\pi e \lambda_k^x) + (M-1) \text{ singularities} + \ln(\pi e \upsilon_k^x) + (M-1) \text{ singularities} - \ln(\pi^2 e^2 \check{\lambda}_1 \cdot \check{\lambda}_2) - 2(M-1) \text{ singularities.}$$

This mutual information for the $k^{th}$ mode can be expressed as Eq. (26):

$$I(\vec{S}_{xk}; \vec{S}_{yk}) = \ln\left[\frac{\lambda_k^x \upsilon_k^y}{\check{\lambda}_1 \check{\lambda}_2}\right] \quad (26)$$

It can now be seen that the singularities of $h(\vec{S}_{xk})$ and $h(\vec{S}_{yk})$ are cancelled exactly by the singularities of $h(\vec{s}_{xk}, \vec{s}_{yk})$ as all the singularities are of the same order. With this computational process all numerical difficulties due to singularities are eliminated.

The modal mutual information or MMI may then be defined as the mutual information for all M modes. The (total) mutual information $I(\vec{X}, \vec{Y})$ is then the sum of the modal mutual information of all M modes. The sum of the modal mutual information of all M modes is the "cumulative mutual information".

It is possible to get a simple closed form expressions for $\check{\lambda}_1$ and $\check{\lambda}_2$. Consider Eq. (27):

$$C_{\vec{A}} = E[\vec{A}_{xyk}\vec{A}_{xyk}^H] = \begin{bmatrix} E(|A_{xk}|^2) & E(A_{xk}A_{yk}^*) \\ E(A_{xk}^*A_{yk}) & E(|A_{yk}|^2) \end{bmatrix} \quad (27)$$

$$= \begin{bmatrix} \sigma_{xk}^2 & \delta_{xyk} \cdot \sigma_{xk} \cdot \sigma_{yk} \\ \delta_{xyk}^* \cdot \sigma_{xk} \cdot \sigma_{yk} & \sigma_{yk}^2 \end{bmatrix},$$

$\delta_{xyk}$ is the correlation between $A_{xk}$ and $A_{yk}^*$ and $\sigma_{xk} \cdot \sigma_{yk}$ is the product of the of standard deviations associated with $A_{xk}$ and $A_{yk}$. The modeled signature processes $\vec{X}$ and $\vec{Y}$ in equation (18) provide ordered pair data that can be directly applied to compute $\delta_{xyk}$ For this 2×2 matrix, the eigenvalues may be readily determined and are given by Eq. (28):

$$\check{\lambda}_{1,2} = \left(\frac{\sigma_{xk}^2 + \sigma_{yk}^2}{2}\right) \pm \frac{1}{2}[(\sigma_{xk}^2 + \sigma_{yk}^2) - 4\sigma_{xk}^2 \cdot \sigma_{yk}^2(1-|\delta_{xyk}|^2)]^{1/2} \quad (28)$$

The product $\check{\lambda}_1 \check{\lambda}_2$ may then be simplified to Eq. (29):

$$\check{\lambda}_1 \cdot \check{\lambda}_2 = \sigma_{xk}^2 \cdot \sigma_{yk}^2 (1-|\delta_{xyk}|^2) = \lambda_k^x \cdot \upsilon_k^y (1-|\delta_{xyk}|^2). \quad (29)$$

Finally, the MMI simplifies to the expression in Eq. (30):

$$I(\vec{S}_{xk}; \vec{S}_{yk}) = -\ln[1-|\delta_{xyk}|^2] \quad (30)$$

Some special cases are of interest. When the Gaussian processes $\vec{S}_{xk}$ and $\vec{S}_{yk}$ are highly correlated such that $|\delta_{xyk}| \to 1$, the MMI tends to ∞. When these processes are uncorrelated such that $|\delta_{xyk}| \to 0$, the mutual information tends to zero as well.

That is as it should be since uncorrelated Gaussian processes are statistically independent and the mutual information between independent processes is zero. Indeed, MMI may be considered to be a sensitive indicator of statistical independence and it is this fact that is of importance in using mutual information for database validation within the context of the target discrimination problem.

Figure 6:
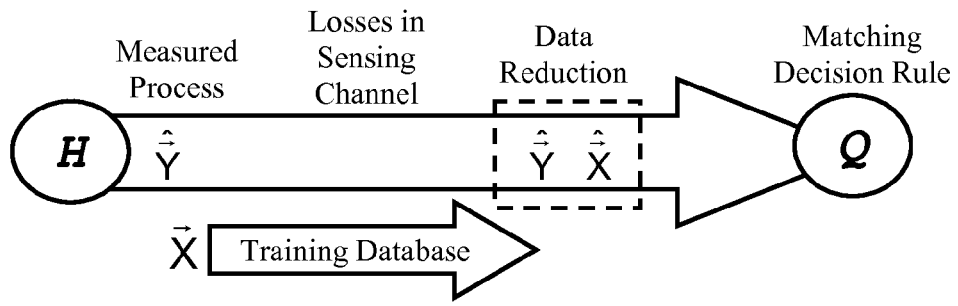
FIG. 6 is an illustration of an information theoretic radar channel model.

The evaluation of the similarity between the algorithm training process $\vec{X}$ and the sensor measured process $\vec{Y}$ may be viewed within a systems model depicting the information flow through the signature sensing and processing components of a radar system as shown in FIG. 6. FIG. 6 shows a continuum relationship between a true state H of a target under measurement and a decision state Q of a matching algorithm, which provides the matching decision rule. This relationship is the basis for performance characterization.

The mutual information between H and Q, I(H;Q), can be related to the probability of error (for binary decision rules) using Fano's Inequality shown in Eq. (31).

$$H(H) - I(H;Q) \leq H(P_e) \quad (31)$$

The operation H(p) is the discrete entropy of the respective discrete random variable p. The data processing inequality tells us that information in the Markov Chain $H \Rightarrow \vec{Y} \Rightarrow \hat{Y} \Rightarrow Q$ cannot be created; only lost in this channel. The injection of side information (training information) $\vec{X}$ in the $\hat{Y}$ space does not affect the Markov nature of $H \Rightarrow \vec{Y} \Rightarrow \hat{Y} \Rightarrow Q$. Information losses within the channel can be attributed to various sources including the signature measurement process, signature signal processing, signature dimensionality reduction-feature selection, decision rule application, and the dissimilarity between a sensor-measured signature process $\vec{Y}$ and a "training" signature process $\vec{X}$. The information loss associated with the dissimilarity between $\vec{X}$ and $\vec{Y}$ can be expressed using the data processing inequality as shown in Eq. (32):

$$I(H;Q) \leq I(H;\hat{Y}) \leq I(H;\vec{Y}) \leq I(H;H) \quad (32)$$

For example, the mutual information between the target state random variables H and the sensor measurement signature process $\vec{Y}$ is greater than the mutual information between H and the target signature feature process (reduced dimensionality from $\vec{Y}$) $\hat{Y}$ and likewise $I(H; \hat{Y})$ is greater than $I(H; Q)$. The losses incurred in the automatic target recognition matching process associated with a dissimilarity between the distribution of the training feature database $\hat{X}$ and the distribution of the sensor measured signature feature process $\hat{Y}$ are captured within the difference between $I(H; \vec{Y}) - I(H; \hat{\vec{Y}})$. The lower dimensional subspace of $\vec{Y}$ ($\hat{\vec{Y}}$) is formed through the use of side information $\vec{X}$ to form the basis of $\vec{Y}$ as derived above. Thus, the system performance loss associated with the dissimilarity between $\vec{X}$ and $\vec{Y}$ is characterized by the use of the basis of $\vec{X}$ in the decomposition of the process $\vec{Y}$.

The use of relative entropy directly to interpret the distance between $\hat{\vec{X}}$ and $\hat{\vec{Y}}$ in terms of the measure $I(H; Q)$ is complicated by the fact that mutual information is not a "true" distance between distributions since it is not symmetric and does not satisfy the triangle inequality. Although relative entropy (and thus mutual information) is not a metric, $D(p\|q)$ does in some circumstances behave like the square of the Euclidean distance and under these conditions convergence in relative entropy implies convergence in the $L_1$ norm. Further development of mutual information in this context as a means to formally interpret $I(\hat{\vec{X}}; \hat{\vec{Y}})$ in terms of $I(H; Q)$ and the loss on $P_e$ is important and is the subject of ongoing efforts by the authors.

The present invention demonstrates the strength of MMI as a physics-based similarity measure in the context of the unique automatic target recognition problem and within the advantages afforded by the reduced dimensional feature space of an eigen-decomposition.

It is desirable that the MMI, which is being used as the measure of similarity, be high between the signatures of two targets drawn from the same class but with some variations, be they small or significant. At the same time it is desired that the mutual information between the signatures of two targets drawn from two different classes be low, even if these two target classes are considered to be "confusers" based on conventional algorithms. Any measure of similarity should be able to "ignore" in-class variations of signatures of targets drawn from the same class and have a high value, while at the same time yielding a low value for the signatures of two targets drawn from different classes, even if the signatures appear "close" by conventional classification algorithm measures. It is further desired that the "low" and "high" values of MMI be well separated so that a decision boundary between these two values is easily determined. Well separated is preferably by a factor of five (5) and in one embodiment of the present invention an order of magnitude i.e. a factor of ten (10). The degree of statistical dependence between two target signature processes will be a function of how similar the statistics are as captured by the scintillation of the complete physical scattering of each target. Targets that physically present electrically similar scattering mechanisms will produce high degrees of dependence. Targets that physically present electrically dissimilar scattering mechanisms will produce low degrees of dependence. The results of a number of numerical simulations and experiments demonstrate that the MMI exhibits this characteristic and meets these requirements.

The following examples and methods are presented as illustrative of the present invention or methods of carrying out the invention, and are not restrictive or limiting of the scope of the invention in any manner Table 1 below lists a number of experiments arranged into two categories. The first category comprising experiments corresponding to case-1 and case-2 experiments considers the comparison of signatures of out-of-class dissimilar targets.

Figure 7:
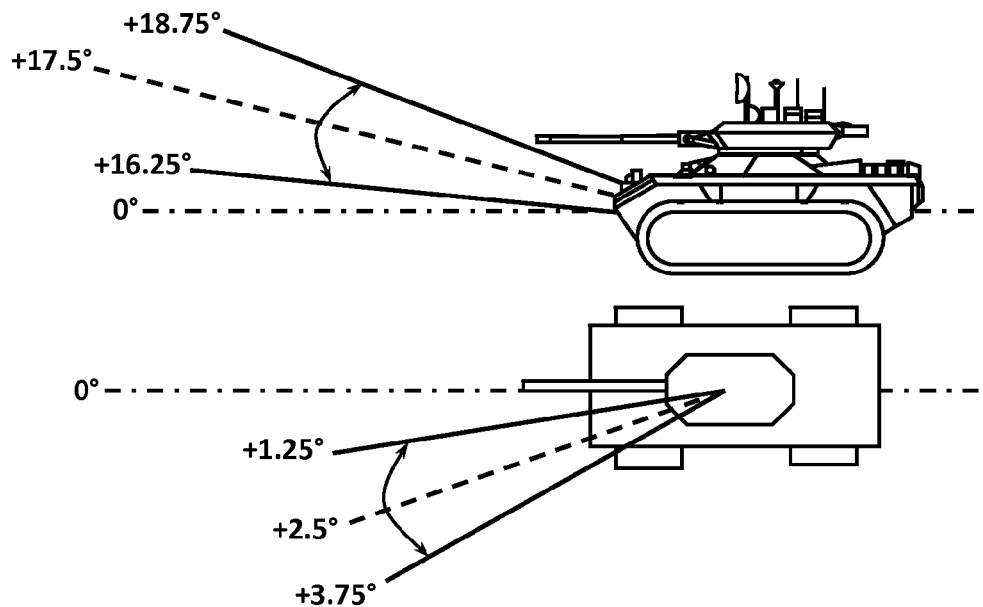
FIG. 7 is an illustration of a target aspect field of view.

The signature sets considered in Table 1 are obtained using electromagnetic prediction codes and were predicted at one foot resolution. The targets include typical ground targets designated as BMP2 (infantry combat vehicle), BDRM (armored ground vehicle), BTR-70 (armored personnel carrier), and T-72 (main battle tank) and are taken to be on a perfect electrically conducting (PEC) ground plane (unless otherwise stated) using vertical polarization. The signature sets are taken over a 2.5°×2.5° azimuth/elevation window about the target aspect angle of 2.5° azimuth and 17.5° elevation as shown in FIG. 7.

Total mutual information is computed as the cumulative sum of MMI. In the experiments below, all total mutual information values provided are based on the sum of the MMI associated with all the modes required to capture 98% of the signature power in both target signature processes.

TABLE 1

Summary of Experiments

| EXPERIMENT | HYPOTHESIS | MI, Nats |
|---|---|---|
| 1. 'Dissimilar Out-of-Class Targets | Underlying target scattering source will generate independent random signatures | 0.4 |
| 2. 'Confuser' Out-of-Class Targets | Underlying target scattering source will generate independent random signatures | 0.2 |
| 3. Similar In-Class Variation of Targets With Ground Plane Removed | Underlying target scattering source will generate dependent random signatures | 10.5 |
| 4. Similar In-Class Variation of Targets Using Scattering Center Decimation | Underlying target scattering source will provide dependency with in-class variation due to distributed scattering source differences | 6 |
| 5. Similar In-Class Variation of Targets Using Removal of Persistent Physical features | Underlying target scattering source will provide dependency with scattering source variation due to significant geometry differences | 11 |
| 6. Incremental Addition of Complex Gaussian Signal | Underlying target scattering structure will generate dependent random signatures | 8-20 |

EXAMPLE 1

BTR-70 Vs. BMP2 (Out-of-Class Variations)

Figure 8:
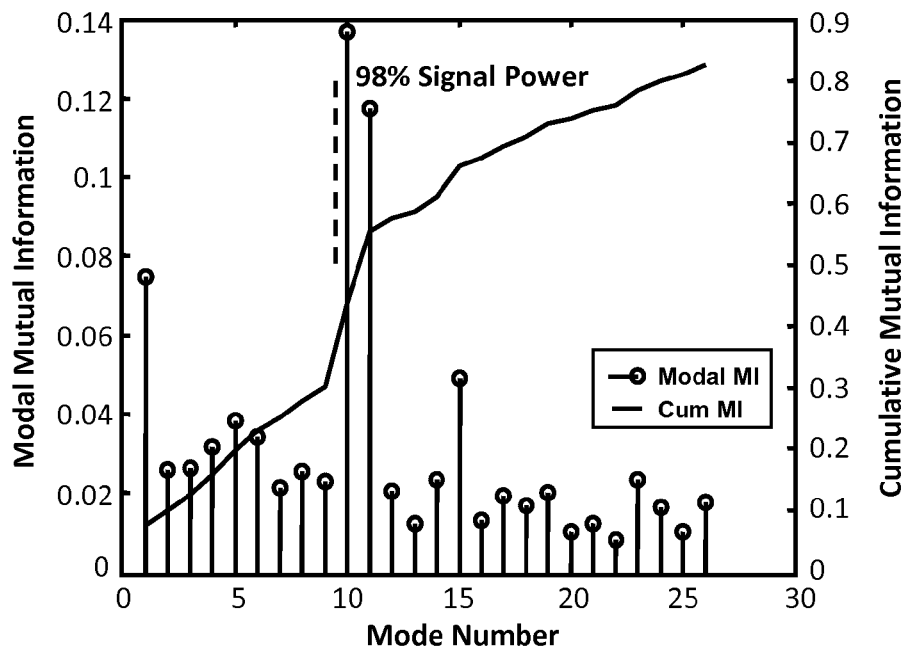
FIG. 8 is a graphical illustration of baseline modal mutual information (MMI) and cumulative mutual information (MI) for BTR-70 & BMP2, cumulative MI of 0.4.

Example 1, which corresponds to case-1 and case-2 of Table 1, pertains to two targets (BTR-70 and BMP2) drawn from two different target classes. The mutual information between the signatures of dissimilar targets would be expected to be low as these signatures would be statistically independent. In FIG. 8, the MMI for the 'out-of-class' target case yields consistently low mutual information across the modes, and the total mutual information is also quite low at approximately 0.4 Nats. Confirming expectations, this low value of mutual information is consistent with the degree of statistical independence to be expected when the signature processes of two very dissimilar scattering sources (targets) are compared.

Figure 9:
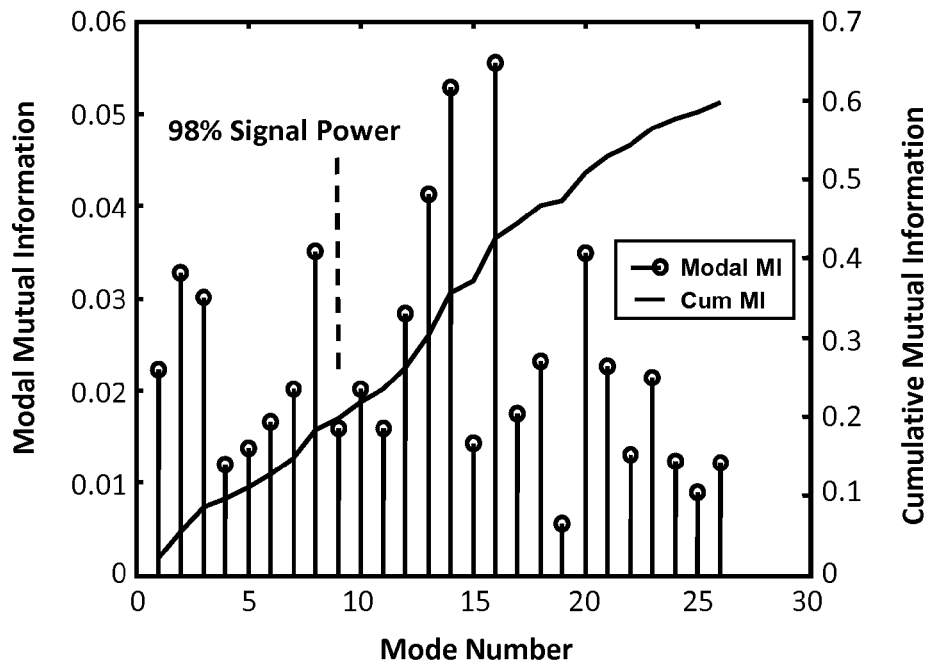
FIG. 9 is a graphical illustration of MMI and cumulative MI for BTR-70 & BDRM; confuser case, cumulative MI of 0.2 Nats.

In the case-2 experiment of Table 1, the previous experiment is extended to conditions where current classification algorithm approaches (those based on geometric measure) indicate that the two targets drawn from two different classes are 'close' and often are confused with one another. The BTR-70 and the BRDM are known to be "confusers" in that sense within the regions under evaluation here. FIG. 9 shows the MMI and cumulative mutual information (MI) for BTR-70 & BDRM in a confuser case with a cumulative MI of 0.2 Nats. With the cumulative MI between the two target signature processes at approximately 0.2 Nats, the results in FIG. 9 show clearly that even for this "confuser" case, the low values of modal and cumulative MI indicate a high degree of independence that is consistent with scattering phenomena taking place on targets from different target classes. This requirement would be a challenging test for any measure of statistical similarity. The modal mutual information measure achieves this desirable result in part because it is a good indicator of statistical independence between two random signature processes. The degree of independence is related to how similar the changing physical scattering (as a function of aspect angle) is between each signature process. Thus the similarity is based on the level of agreement inherent in the statistics captured by the scintillation of the complete physical scattering of each target and not on statistics based on a limited feature representation.

EXAMPLE 2

BTR-70 (In-Class Variations)

Figure 10:
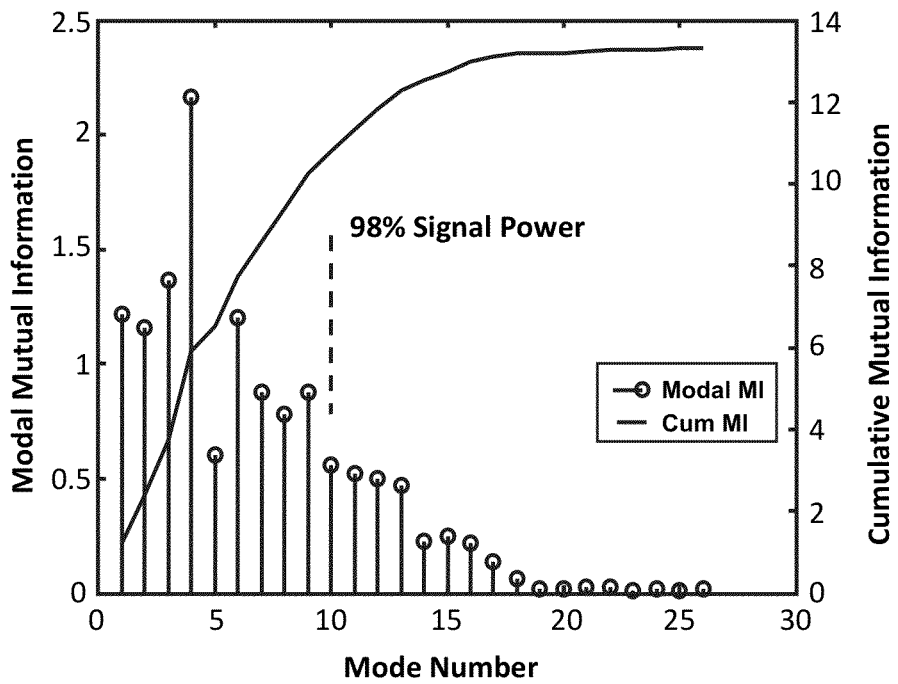
FIG. 10 is a graphical illustration of MMI and cumulative MI for BTR-70 with ground plane & BTR-70 without ground plane; similar target case, cumulative MI of 10.5 Nats.

Example 2 corresponds to case-3 and case-4 in Table 1. Two targets from the same class are often similar but not identical. The physical differences can be minor or quite striking A number of experiments pertaining to the MMI and cumulative MI of in-class targets with different degrees of variations are considered. Case-3 of Table 1 corresponds to the signatures of the BTR-70 with and without the PEC ground plane representing a "minor" difference. For this case, the mutual information is expected to be high and is so demonstrated by the results shown in FIG. 10, with the cumulative MI at 10.5 Nats. FIG. 10 shows MMI and cumulative MI for BTR-70 with ground plane & BTR-70 without ground plane, a similar target case.

The target signature may be considered to be the sum of scattering from a collection of scattering centers. Variations in target and signatures, ranging from "marginal" to "major," can be simulated by including or excluding chosen groups of scattering centers. In-class variations are often the result of certain physical features being removed from or added to a basic target configuration. For example, fuel barrels may be added to or removed from a tank, or a tank may have one of its parts obscured.

Figure 11:
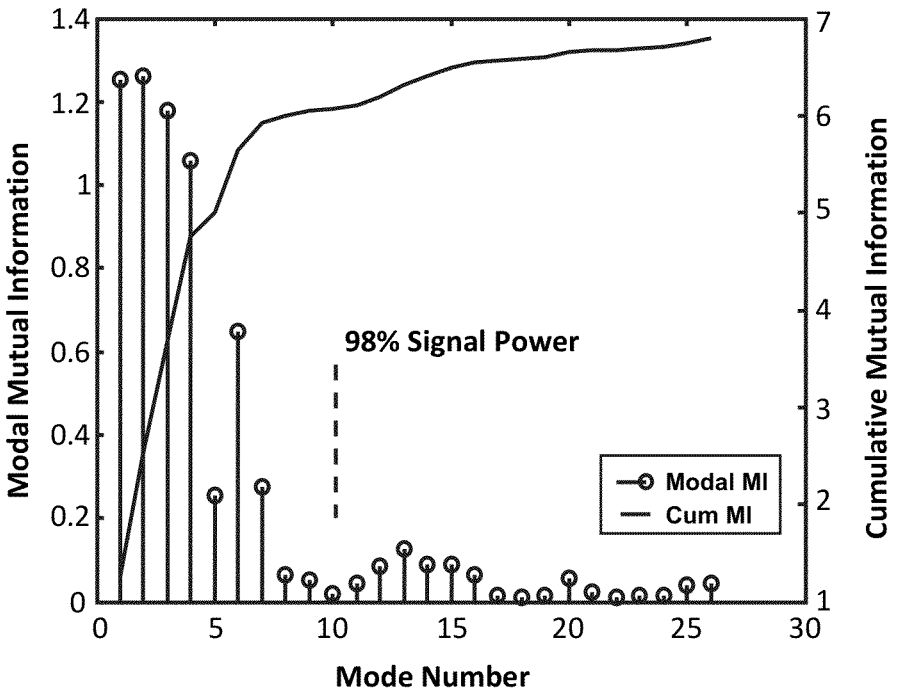
FIG. 11 is a graphical illustration of MMI and cumulative MI for BTR-70 baseline & BTR-70 with the top 20 scattering centers only, cumulative MI of 6 Nats.

The uncertainty in computational signature processes may result from reduced detail within the modeling and prediction process. Analyzing the behavior of mutual information with respect to reduced scatter representation is one way to study this area. In the experiment corresponding to case-4 of Table 1, a number of scattering centers are decimated to test the suitability of mutual information as a measure of similarity. A favorable result would indicate that small deviations or omissions of small scattering detail would not impact the measure of similarity. In this experiment, the MMI between the baseline BTR-70 and a decimated version of the BTR-70 comprising the top 20 (amplitude ranking) scattering centers is determined. The results shown in FIG. 11 indicate a cumulative MI between the signature processes to be a high value of approximately 6 Nats. Such a high value suggests that the MMI, used here as a measure of similarity, still correctly identifies the target with decimated scattering centers as an in-class target, despite the loss of some detail. This robustness with respect to the inevitable variations in the signatures of in-class targets is important in addressing issues associated with articulation and target configuration.

EXAMPLE 3

T-72 (In-Class Variations)

Example 3 corresponds to case-5 in Table 1. In-class variations from the baseline geometry may be obtained by removing certain physical features, and an effort is made to ensure that the scattering from these features is "persistent" over the whole target aspect angle window. The T-72 tank is used as the baseline target in the experiments designated as case-5 in Table 1 with three specific geometry components identified for study. The geometry components identified are the forward fenders, rear fuel barrels, and the gun barrel. The scattering from the front fender is eliminated, and FIGS. 12A and 12B illustrate the two dimensional image of the T-72 tank with and without the fender scattering. The reduction in resolved signal power within the cells associated with this geometry indicates the significant effect of eliminating the fender scattering. The results of this first of these sub-experiments are presented in FIG. 13 where the MMI is computed for the T-72 with and without fender scattering. The cumulative MI is computed as approximately 16 Nats, indicating a high degree of similarity.

Figure 18:
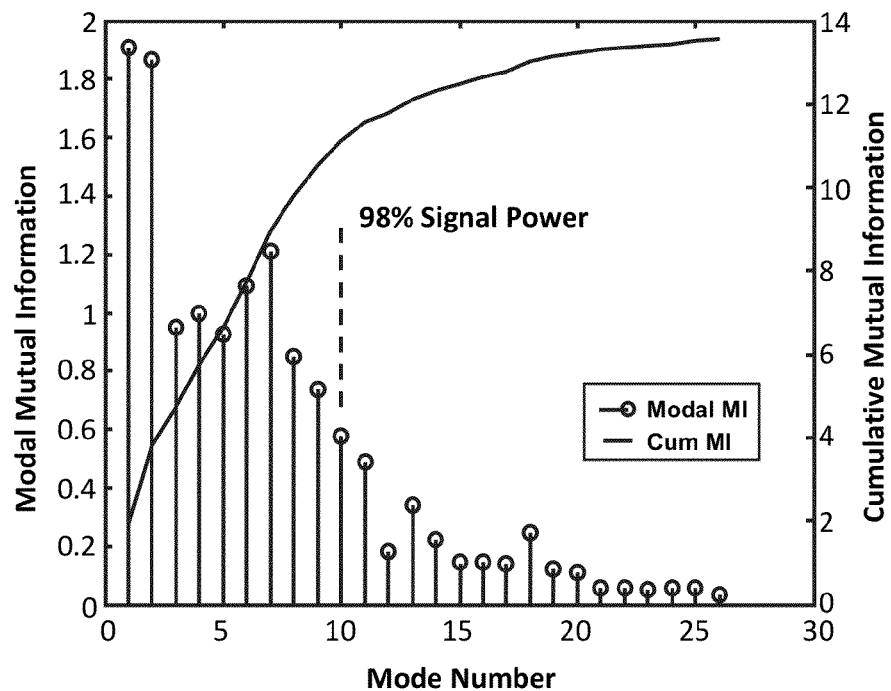
FIG. 18 is a graphical illustration of MMI and cumulative MI for baseline T-72 and T-72 without fenders, fuel barrel, and gun barrel scattering, cumulative MI of 11 Nats.

FIGS. 14 through 18 show similar results for the sub-experiments involving the removal of the fuel barrel scattering in FIGS. 14A, 14B, and 15, the gun barrel scattering in FIGS. 16A, 16B, and 17, and the fender, fuel barrel, and gun barrel scattering in FIG. 18. FIGS. 14A and 14B are two dimensional images of a T-72 tank with and without fuel barrel scattering. The cumulative MI for the T-72 as shown in FIG. 15 with and without fuel barrel scattering is approximately 14 Nats, indicating again a high degree of similarity. FIGS. 16A and 16B are two dimensional images of a T-72 tank with and without gun barrel scattering. The results of this third sub-experiment show the cumulative MI for the T-72 with and without gun barrel scattering to be 12 Nats, again indicating a high degree of similarity. In the final sub-experiment for case-5, all three physical features of the T-72 tank are removed (fenders, fuel barrels and gun removed). In FIG. 18, the cumulative MI for the baseline T-72 and the modified T-72 is approximately 11 Nats (two dimensional images not shown).

As shown by FIGS. 12 through 18, mutual information used as a measure of similarity correctly identifies the modified targets in all cases. Mutual information remains high for a range of in-class variations and is close to zero for out-of-class targets, even when they appear "close" by conventional measures that operate on isolated geometric features. Furthermore, the mutual information remains high even when isolated geometric features (geometry that is deemed important in conventional statistical pattern recognition based discrimination methods) are removed.

EXAMPLE 4

BMP2 vs. BMP2 with Additive Gaussian Signals

Figure 19:
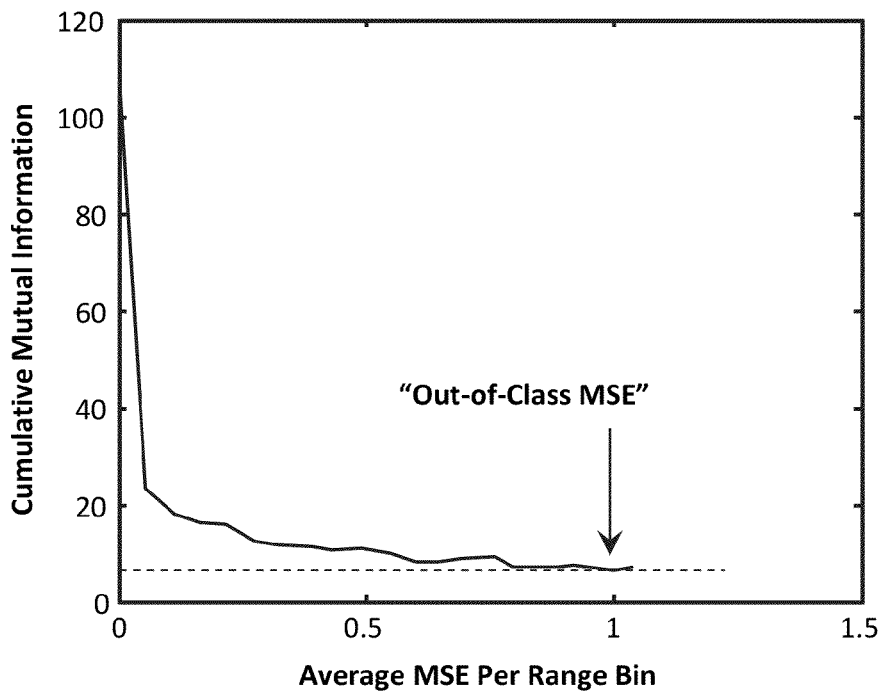
FIG. 19 is a graphical illustration of MMI versus mean squared error for baseline BMP2 and BMP2 with additive Gaussian signal demonstrating dependence at significant levels of added distortion.

Experiments conducted so far show that mutual information remains high for a range of in-class variations and is close to zero for out of class targets, even when they appear "close" by other measures. It is natural to wonder if it is possible to make so many changes in the baseline target that the modified target could be considered a dissimilar target resulting in a mutual information level close to zero. To test this notion and starting with the signature process of a baseline target (BMP2) a new signature process is obtained by the addition of uncorrelated Gaussian signal. The mean squared error (MSE) between the modified and baseline signatures serves as a measure of "distortion." Example 4 corresponds to this final case, case-6, in Table 1. FIG. 19 shows the cumulative MI as function of the mean squared error for baseline BMP2 and BMP2 with additive Gaussian signals demonstrating dependence at significant levels of added distortion. The salient feature of FIG. 19 is that as MSE increases, to a level typical of dissimilar targets, the mutual information levels off but does not actually become zero. The reason for this behavior is that irrespective of the amount of "distortion" added to the original signature, the modified signature never becomes an independent process. Mutual information is zero only when the two processes are independent. It is this property of mutual information that leads to the desirable result of mutual information being high for a rather wide range of in-class variations, while remaining low for out-of-class variations.

The role of signature database validation is significant in achieving realizable radar signature exploitation systems. Developing similarity measures that operate within an automatic target recognition systems framework is central to building this technology. The research and key findings associated with an information theoretic similarity measure to provide a high range resolution signal model. The database in one embodiment of the present invention includes measured radar data and modeled synthetic data where the measured data is compared to the synthetic data and is mathematically combined to create a hybrid signature set using the above computed MMI and/or cumulative mutual information. In one embodiment of the present invention, the synthetic signature set includes both similar targets and dissimilar targets. The hybrid signature set in one embodiment of the present invention is automatically compared with the target signature to provide automatic target recognition based upon the target classification calculations.

Computationally stable techniques for computing MMI are herein disclosed for use in radar and multi-radar signature process database validation. Numerical experiments have been conducted to validate the approach taken and to demonstrate that mutual information comprising a sum total of MMI may be used to determine if two signature processes correspond to in-class or out-of-class targets.

Experimentally it was shown that modal information is consistently high between signatures corresponding to targets with in-class variations and consistently low (independent) for out-of-class target comparisons, including the 'confuser' case. While the full interpretation of mutual information's ability to measure the common signature scattering information has not been fully exploited, the inherent capability to test for statistical independence has been demonstrated to be useful. The apparent 'sharpness' of the MMI as a measure of statistical independence is compatible with efficient methods of hypothesis testing and training, which will be needed to fully realize the method in assessing a hybrid signature process for use within an automatic target recognition system.

MMI provides an improved similarity measurement method to test the suitability of databases for training within a radar target identification system. Other applications may include radar integrated with an automatic target recognition systems database. In addition to this, the characteristics of mutual information have strong appeal in dealing with real word artifacts of contemporary radar signature data. The ability of mutual information to determine the common information between two signature processes even with the addition of large levels of additive Gaussian signal shows great promise to operate in high interference and noise conditions, often experienced in measured radar signature data. Potential solutions to today's troublesome issues of uncertainty in signature alignment and calibration faced by many feature based similarity approaches may be better addressed with the process herein disclosed.

Regardless of the dimensionality and the bandwidth of the automatic target recognition signature process, this method of statistical database comparison for signature processes within the one-dimensional (HRR signature format) domain may be applied to signatures in higher dimensions and at higher resolution (projecting to lower dimension and with reduced bandwidth) in order to address issues within the database area.

Figure 20:
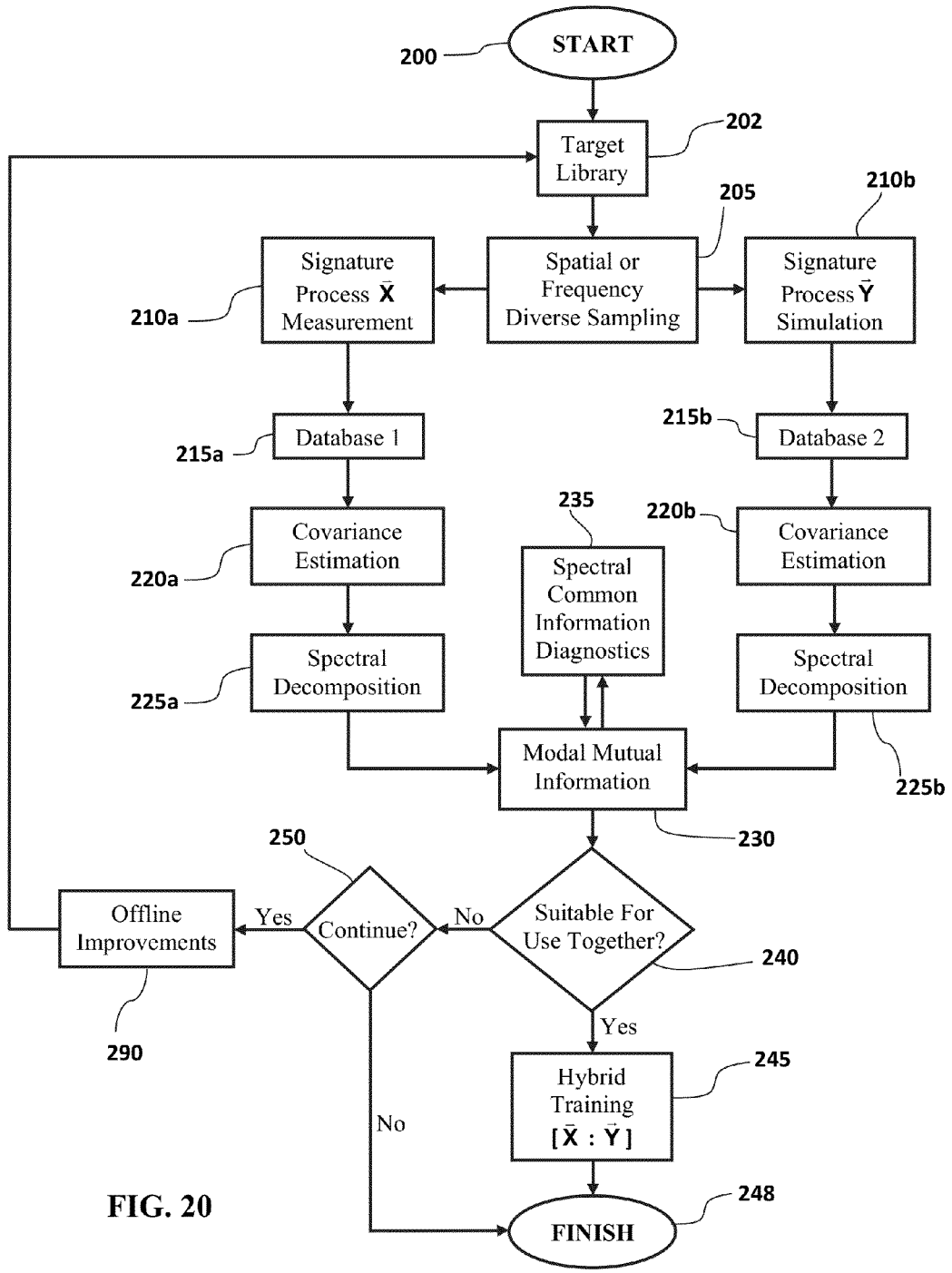
FIG. 20 is a flowchart of an exemplary embodiment of a method for comparing and assessing two databases containing radar information using MMI calculations.

FIG. 20 is a flowchart illustrating an exemplary embodiment of a method of using MMI to compare and assess two radar signature databases for use in training a radar target recognition decision algorithm. One or more of the steps of the method shown in FIG. 20 may be fully or partially performed on practically any properly configured device, including a computer, computer system, or programmable device, e.g., multi-user or single-user computers, desktop computers, portable computers and devices, computers and computer systems aboard aircraft and other vehicles, handheld devices, network devices, mobile phones, etc., all of which will hereinafter be referred to simply as a "computer."

The method begins (Step 200) by providing a target library containing targets drawn from a variety of different target classes (Step 202). Multiple samples are gathered using spatial (aspect angle) or frequency diverse sampling (Step 205). Radar signature data is generated using two high range resolution signature processes $\vec{X}$ and $\vec{Y}$ (Step 210a, 210b), followed by compilation of the respective radar signature data into two databases, Database 1 and Database 2 (Step 215a, 215b). The radar signature data may include measured radar data developed from radar signatures gathered via a measurement process from a variety of targets in a laboratory or other controlled environment. The radar signature data may also be synthetic radar data obtained from numerical simulations and/or computational modeling performed on a geometry model. In the embodiment of the method shown in FIG. 20, Database 1 includes measured radar data, while Database 2 includes synthetic radar data. In another embodiment, each database may include a mixture of measured radar data and synthetic radar data.

Following generation of the radar signature data (Step 210a, 210b), the database containing measured radar data (Database 1 in this example) and the database containing the synthetic modeled radar data (Database 2 in this example) are prepared for comparison with each other. As described above, a covariance matrix is estimated for each process (Step 220a, 220b), followed by a spectral decomposition of the respective covariance matrices (Step 225a, 225b). The two databases generated by random signature processes $\vec{X}$ and $\vec{Y}$ are then mathematically compared to each other using an information theoretic method that computes an amount of cumulative mutual information based on MMI (Step 230). As used throughout, the terms "total mutual information" and "cumulative mutual information" are synonymous with total or cumulative MMI, all of which refer to the sum total of common information between the two databases.

Spectral common information diagnostics (Step 235) may be used to evaluate similarity as a function of the degree of significance (ranked on power) of each mode of the signature process. This mode-by-mode comparison is useful in directing improvements in $\vec{X}$ and/or $\vec{Y}$ should this be necessary (see STEP 290 described in more detail below). Computation of cumulative mutual information comprising MMI avoids one or more numerical instability issues normally associated with the computation of mutual information. These issues may result in false positives, false negatives, and/or inconclusive results.

After the amount of mutual information between the two databases is calculated (Step 230), the suitability of using signature processes $\vec{X}$ and $\vec{Y}$ together as a hybrid radar signature database is evaluated by applying a set of suitability criteria (Step 240). When the two signature processes $\vec{X}$ and $\vec{Y}$ correspond to the same target class, the cumulative mutual information is expected to be high. One or more the targets may have "in-class" variations. These in-class variations from the baseline geometry may be minor, such as differences in the terrain on which the target is located, or they may be significant variations, such as the removal or addition of physical features like fuel barrels. This high level of correlation is demonstrated by determining the cumulative mutual information between the signature processes of a target and its variants.

When the two signature processes correspond to two different target classes, the cumulative mutual information is expected to be near zero, even when "out-of-class" variations cause the targets to appear to be a "close" match that could be considered a "confuser" based on conventional geometric- or feature-based measures. A confuser may include a false positive, a false negative, or an inconclusive determination. The presently disclosed method is still able to differentiate between confusers in part because the high range resolution signature processes of two different target classes are independent, and the cumulative mutual information between independent processes is zero, even when they appear "close" by conventional measures.

Referring to FIG. 20, the suitability criteria applied in Step 240 include an assessment of the amount of mutual information between the two processes. To be suitable for use together, where the two signature processes correspond to targets drawn from the same class i.e. in-class targets, the cumulative mutual information should be high. In one embodiment of the method, the cumulative mutual information is ≥5 Nats. In another embodiment, the cumulative mutual information is at least about five times greater for in-class targets as compared to out-of-class targets. In another embodiment, the cumulative mutual information is at least about ten times greater for in-class targets as compared to out-of-class targets. Where the two signature processes correspond to targets drawn from two different classes i.e. out-of-class targets, the cumulative mutual information should be low. In one embodiment, the cumulative mutual information is greater than zero but less than or equal to one.

Where the amount of mutual information indicates that the two processes are suitable for use together ("Yes"), a hybrid training database comprising a combination of signature processes $\vec{X}$ and $\vec{Y}$ may be generated for use in training radar target recognition decision algorithms (Step 245), and the method is terminated (Step 248). The hybrid signature set in one embodiment includes both similar targets and dissimilar targets. The hybrid signature database may include surrogate radar data, measured data, modeled data, or any combination thereof.

Where the amount of mutual information between the two processes fails to indicate suitability ("No"), a decision is made whether to continue the process (Step 250). If the decision is made to discontinue the process ("No"), the method terminates (Step 248). Alternatively, if the decision is made to continue the process ("Yes"), the method may be restarted at the target library (Step 202) following offline process improvements to one or more failing targets or target classes within $\vec{X}$, $\vec{Y}$, or both (Step 290). Measurement and/or modeling process improvements may be required in the event that the suitability criteria for hybridization of $\vec{X}$, $\vec{Y}$ is not met. Improvements to the measurement process may include increased signal-t-noise ratio or an increase in the number of Bits within the analogue-to-digital converter. Several process improvement methods are known for synthetic data and may involve improvements to geometry models, increased geometry representation, or other enhancements to modeling fidelity. Likewise, several process improvement methods for measured data processes are known and may involve improved measurement procedures such as increasing the signal-to-noise ratio, increasing the number of Bits within the analogue-to-digital converter, and/or reducing interference.

In addition to the use of MMI as a method to validate multi-source radar signature databases for hybrid training, a modal mutual information method may be used as part of a tactical classifier to provide automatic target recognition (ATR). Cumulative mutual information calculations may be performed real time in a fielded radar system to compare a measured signature process to a training process developed from a hybrid signature database, which may be validated as described above. The measured signature process derived from the real-time target measurements is generated through a mapping to a fixed measurement aspect angle to the target and a range of frequency sub-bands centered at a center reference transmit frequency. The hybrid signature process is then automatically compared with a tactically measured target signature process to provide ATR based on cumulative mutual information calculations.

Cumulative mutual information calculations for ATR are based on the statistical dependence between the target under measurement and the on-board target databases for each target class under comparison. In the case of conventional target classification calculations techniques, a signature measured under field conditions (which may be considered to be a sample realization of a random process) is compared to the signature random process corresponding to the different target classes of interest comprising a database. Unlike conventional target classification calculations, the mutual information-based target classification calculation involves the comparison of two random signature processes. The mutual information-based target classification method is a measure of the dependence between random variables and is a more general (contains all the statistics) measure of similarity in that it contains all of the statistics, making it a more robust measure of comparison.

Figure 21:
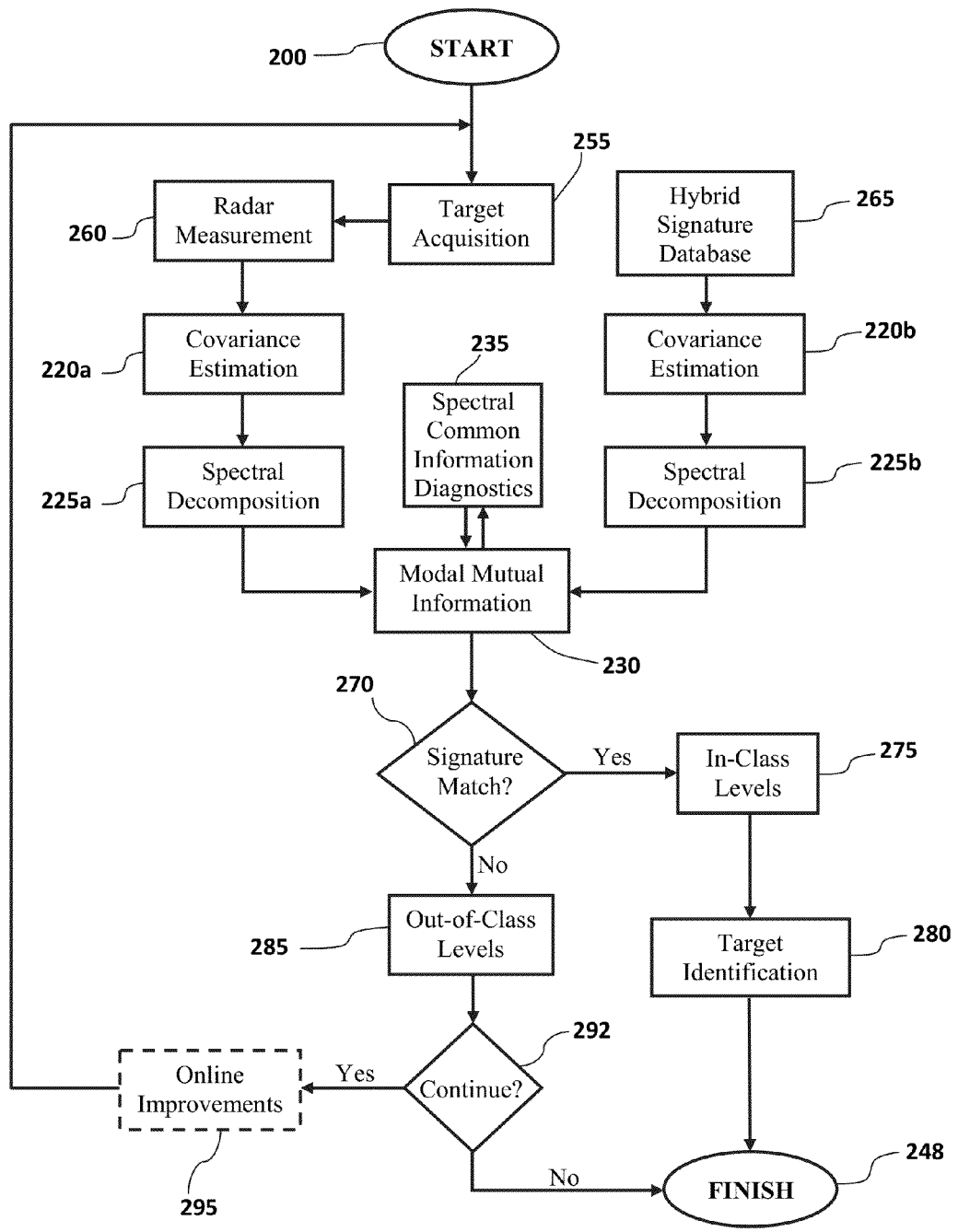
FIG. 21 is a flowchart of an exemplary embodiment of a method for using a MMI information theoretic approach in an automatic target recognition system to make real-time identifications of targets in the field.

FIG. 21 is a flowchart illustrating an exemplary method of using modal mutual information calculations to provide automatic recognition of a target in the field. The steps of the method shown in FIG. 21 may be fully or partially performed on practically any properly configured device, including a computer, computer system, or programmable device, e.g., multi-user or single-user computers, desktop computers, portable computers and devices, computers and computer systems aboard aircraft and other vehicles, handheld devices, network devices, mobile phones, etc., all of which will hereinafter be referred to simply as a "computer." The method begins (Step 200), and a target is acquired (Step 255) by an onboard radar system. In the next step, a real-time radar measurement of the target is generated (Step 260). The real-time radar measurement is generated by a mapping to a fixed measurement aspect angle to a target and a range of frequency sub-bands centered at a center reference transmit frequency. A hybrid signature database containing a variety of radar signatures is provided (Step 265). In one embodiment, the hybrid signature database contains radar signature processes validated using the methods described above.

The real-time radar measurement and the hybrid signature database are then prepared for comparison with each other. A covariance matrix is estimated for each process (Step 220*a*, 220*b*), followed by a spectral decomposition of the respective covariance matrices (Step 225*a*, 225*b*), both as described above. The amount of cumulative mutual information between the real-time radar measurement and the hybrid signature database is calculated from the MMI as described above (Step 230). Spectral common information diagnostics (Step 235) are used to evaluate similarity as a function of the degree of significance (ranked on power) of each mode of the signature process. This mode-by-mode comparison is useful in potential subsequent target acquisitions (see Step 295 described in more detail below).

Based on the amount of cumulative mutual information, the real-time radar measurement is compared to the hybrid signature database and "matched" to one or more radar signatures in the database (Step 270). Where the modal mutual information calculation (Step 230) reveals in-class levels (Step 275), the target may be identified (Step 280), and the process terminates (Step 248). In one embodiment of the method, the cumulative mutual information calculated (Step 230) is ≥5 Nats, which is consistent with in-class declaration levels.

Where the modal mutual information calculation (Step 230) reveals out-of-class levels (Step 285), the target cannot be identified. In one embodiment of the method, the amount of cumulative mutual information calculated (Step 230) is greater than zero but less than or equal to 1, which is consistent with out-of-class declaration levels. A decision is then made whether to continue the process (Step 292). If the decision is made to discontinue the process ("No"), the method terminates (Step 248). If the decision is made to continue the process ("Yes"), subsequent transmissions may be performed without adaptation of the transmitted waveform, and the method starts over again with target acquisition (Step 255). In an alternative embodiment, an additional step (Step 295) may be performed prior to returning to the target acquisition step (Step 255). Target acquisitions resulting in no declaration of an in-class target may be scheduled for subsequent target acquisitions and ATR calculations using the mutual information method. Online adaptations to the transmitted waveform are possible prior to the subsequent acquisitions and mutual information calculations. Online adaptations to the transmitted waveform may include modifications to the center reference transmit frequency in order to generate a new scattering response (a function of frequency) that may increase the statistical dependence between the measured signature process and the true target class within the hybrid signature database. This online adaptation may include a modification of the center reference transmit frequency. Changes to the center transmit frequency could improve the modal mutual information calculation results, which may result in successful identification of the target.

Although specific embodiments have been described in detail in the foregoing description and illustrated in the drawings, various other embodiments, changes, and modifications to the disclosed embodiment(s) will become apparent to those skilled in the art. All such other embodiments, changes, and modifications are intended to come within the spirit and scope of the appended claims.

What is claimed is:

1. A method for assessing radar signature databases for use in training a radar target recognition decision algorithm, the method comprising the steps of:
generating radar signature data from at least three targets using a first process and a second process, wherein the radar signature data includes at least one of measured radar data and synthetic radar data, and wherein the targets comprise at least two different target classes, at least two targets being in a same target class and at least one target being in a different target class;
producing a first radar signature database using the first process and a second radar signature database using the second process;
comparing the first radar signature database and the second radar signature database using an information theoretic method;
computing an amount of cumulative mutual information between the first radar signature database and the second radar signature database for targets comprising the same target class and for targets comprising different target classes, wherein the cumulative mutual information comprises a sum of modal mutual information, MMI, derived from comparison of radar signature data from at least two targets, whereby numerical instabilities often incurred in computation of cumulative mutual information are eliminated through incremental computation of MMI; and
based on the amount of cumulative mutual information between the first radar signature database and the second radar signature database, determining whether the first process and second process are suitable for use together to generate a hybrid radar signature database for training the radar target recognition decision algorithm.

2. The method of claim 1 wherein the targets comprising the same target class include at least one target comprising at least one in-class structural variation of at least one dominant and isolated geometric mechanism that is conventionally critical to successful classification of targets to the same target class, wherein the in-class structural variation produces conventional signature features that are dissimilar to the radar signature data corresponding to the same target class.

3. The method of claim 2 wherein the amount of cumulative mutual information is ≥5 Nats.

4. The method of claim 1 wherein at least one of the targets comprising a different target class includes at least one target comprising at least one out-of-class structural variation of at least one dominant and isolated geometric mechanism that is conventionally critical to successful classification of targets to different target classes, wherein the out-of-class structural variation produces conventional signature features that are similar to the radar signature data corresponding to the different target class.

5. The method of claim 4 wherein the amount of cumulative mutual information is <5 Nats.

6. The method of claim 4 wherein the amount of cumulative mutual information is greater than zero and less than or equal to one.

7. The method of claim 1 further comprising conducting offline improvements to at least one target class.

8. The method of claim 1 wherein the first radar signature database consists of measured radar data and wherein the second radar signature database consists of synthetic radar data.

9. A method of using cumulative modal mutual information to identify real-time target measurements using automatic target recognition, the method comprising the steps of:
generating within an onboard radar system a first radar signature process measurement derived from a real-time target measurement, wherein the first radar signature process measurement is generated through a mapping to a fixed measurement aspect angle to a field target and a range of frequency sub-bands centered at a center reference transmit frequency;
producing a second radar signature process derived from a hybrid signature database, wherein the hybrid signature database comprises a combination of radar signature data derived from measured radar data and synthetic radar data;

comparing the first radar signature process measurement and the second radar signature process using an information theoretic method;

computing in real-time an amount of cumulative mutual information between the first radar signature process measurement and the second radar signature process, wherein the cumulative mutual information comprises a sum of modal mutual information, MMI, derived from comparison of the first radar signature process measurement and the second radar signature process, whereby numerical instabilities associated with computing cumulative mutual information are eliminated through incremental computation and combination of MMI; and based on the amount of cumulative mutual information between the first radar signature process measurement and the second radar signature process, determining an identity of the field target.

10. The method of claim 9 wherein the target comprises at least one in-class structural variation of at least one dominant and isolated geometric mechanism that is conventionally critical to successful classification of the target, wherein the in-class structural variation produces signature features that are dissimilar to the radar signature data corresponding to the same target class.

11. The method of claim 10 wherein the amount of cumulative mutual information is ≥5 Nats.

12. The method of claim 9 wherein the target comprises at least one out-of-class structural variation of at least one dominant and isolated geometric mechanism that is conventionally critical to successful classification of the target, wherein the out-of-class structural variation produces signature features that are similar to the radar signature data corresponding to the different target class.

13. The method of claim 12 wherein the amount of cumulative mutual information is <5 Nats.

14. The method of claim 12 wherein the amount of cumulative mutual information is greater than zero and less than or equal to one.

15. The method of claim 9 wherein the hybrid signature database is validated using the method of claim 1.

16. The method of claim 9 further comprising conducting online improvements to a transmission waveform.

* * * * *